(12) United States Patent
Ryu et al.

(10) Patent No.: US 12,069,507 B2
(45) Date of Patent: Aug. 20, 2024

(54) BUFFER STATUS REPORT FRAME TRANSMISSION IN A MULTI-LINK COMMUNICATION ENVIRONMENT

(71) Applicant: Ofinno, LLC, Reston, VA (US)

(72) Inventors: Kiseon Ryu, McLean, VA (US); Jeongki Kim, Fairfax, VA (US); Esmael Hejazi Dinan, McLean, VA (US); Leonardo Alisasis Lanante, Reston, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/369,878

(22) Filed: Sep. 19, 2023

(65) Prior Publication Data

US 2024/0007896 A1    Jan. 4, 2024

Related U.S. Application Data

(63) Continuation of application No. PCT/US2023/011669, filed on Jan. 27, 2023.

(60) Provisional application No. 63/304,031, filed on Jan. 28, 2022.

(51) Int. Cl.
*H04W 28/02* (2009.01)

(52) U.S. Cl.
CPC ... *H04W 28/0268* (2013.01); *H04W 28/0278* (2013.01)

(58) Field of Classification Search
CPC ......... H04W 28/0268; H04W 28/0278; H04W 28/02; H04W 72/12; H04W 72/1263; H04W 76/15; H04W 76/20
See application file for complete search history.

(56) References Cited

U.S. PATENT DOCUMENTS

| | | |
|---|---|---|
| 2019/0261402 A1 | 8/2019 | Asterjadhi et al. |
| 2020/0214036 A1 | 6/2020 | Min et al. |
| 2020/0367204 A1 * | 11/2020 | Li .................. H04W 72/0446 |
| 2021/0360521 A1 | 11/2021 | Seok et al. |
| 2023/0013454 A1 | 1/2023 | Gan et al. |
| 2023/0102066 A1 | 3/2023 | Ikeda |
| 2023/0107072 A1 | 4/2023 | Kim et al. |

(Continued)

FOREIGN PATENT DOCUMENTS

| | | | |
|---|---|---|---|
| EP | 4 087 344 A1 | 11/2022 | |
| EP | 4258799 A1 * | 10/2023 | ............... H04L 1/00 |

(Continued)

OTHER PUBLICATIONS

Laurent Cariou et al.; "Multi-link: steps for using a link"; IEEE 802.11-19/1924r1; Nov. 16, 2019.

(Continued)

*Primary Examiner* — Sudesh M Patidar
(74) *Attorney, Agent, or Firm* — Yasser Mourtada; Kavon Nasabzadeh; Philip R. Smith

(57) ABSTRACT

A non-access point (non-AP) multi-link device (MLD) negotiates with an access point (AP) MLD a traffic identifier (TID)-to-link mapping that maps a TID to a first link between the non-AP MLD and the AP MLD. In response to receiving a trigger frame on a second link to which the TID is not mapped according to the TID-to-link mapping, the non-AP MLD transmits to the AP MLD, via the second link, a Quality of Service (QoS) null frame comprising the TID.

20 Claims, 19 Drawing Sheets

(56) References Cited

U.S. PATENT DOCUMENTS

| | | | |
|---|---|---|---|
| 2023/0117842 A1* | 4/2023 | Xin | H04W 28/0268 370/235 |
| 2023/0209536 A1* | 6/2023 | Guo | H04W 72/1263 370/329 |
| 2023/0232276 A1 | 7/2023 | Chitrakar et al. | |

FOREIGN PATENT DOCUMENTS

| | | | |
|---|---|---|---|
| GB | 2606593 A * | 11/2022 | H04L 5/003 |
| WO | 2021/167366 A1 | 8/2021 | |
| WO | 2022/005215 A1 | 1/2022 | |
| WO | 2022/032150 A1 | 2/2022 | |
| WO | 2022/145596 A1 | 7/2022 | |

OTHER PUBLICATIONS

IEEE 802.11-21/1808r1; Nov. 2022; IEEE P802.11 Wireless LANs; CR of CID 8197; Author(s): Yunbo Li et al.

IEEE 802.11-21/1898r7; Nov. 2022; IEEE P802.11 Wireless LANs; MLO-CC36 resolution to CIDs related to 35.3.6.1.1; Author: Laurent Cariou.

IEEE P802.11be/D1.3, Nov. 2021; 35. Extremely high throughput (EHT) MAC specification.

IEEE P802.11-REVme/D1.0, Dec. 2021; 26. High-efficiency (HE) MAC specification(11ax).

IEEE P802.11 ax™/D3.3; Draft Standard for Information technology—Telecommunications and information exchange between systems—Local and metropolitan area networks—Specific requirements'; Part 11: Wireless LAN Medium Access Control (MAC) and Physical Layer (PHY) Specifications; Amendment 1: Enhancements for High Efficiency; WLAN; Dec. 2018.

International Search Report and Written Opinion for International Application No. PCT/US2023/011669 mailed Jun. 9, 2023.

European Office Action, mailed Feb. 15, 2024, in EP Patent Application No. 23708062.7.

* cited by examiner

BUFFER STATUS REPORT FRAME TRANSMISSION IN A MULTI-LINK COMMUNICATION ENVIRONMENT

CROSS-REFERENCE TO RELATED APPLICATIONS

This application is a continuation of International Application No. PCT/US2023/011669, filed Jan. 27, 2023, which claims the benefit of U.S. Provisional Application No. 63/304,031, filed Jan. 28, 2022, all of which are hereby incorporated by reference in their entireties.

BRIEF DESCRIPTION OF THE DRAWINGS

Examples of several of the various embodiments of the present disclosure are described herein with reference to the drawings.

DETAILED DESCRIPTION

Figure 1:
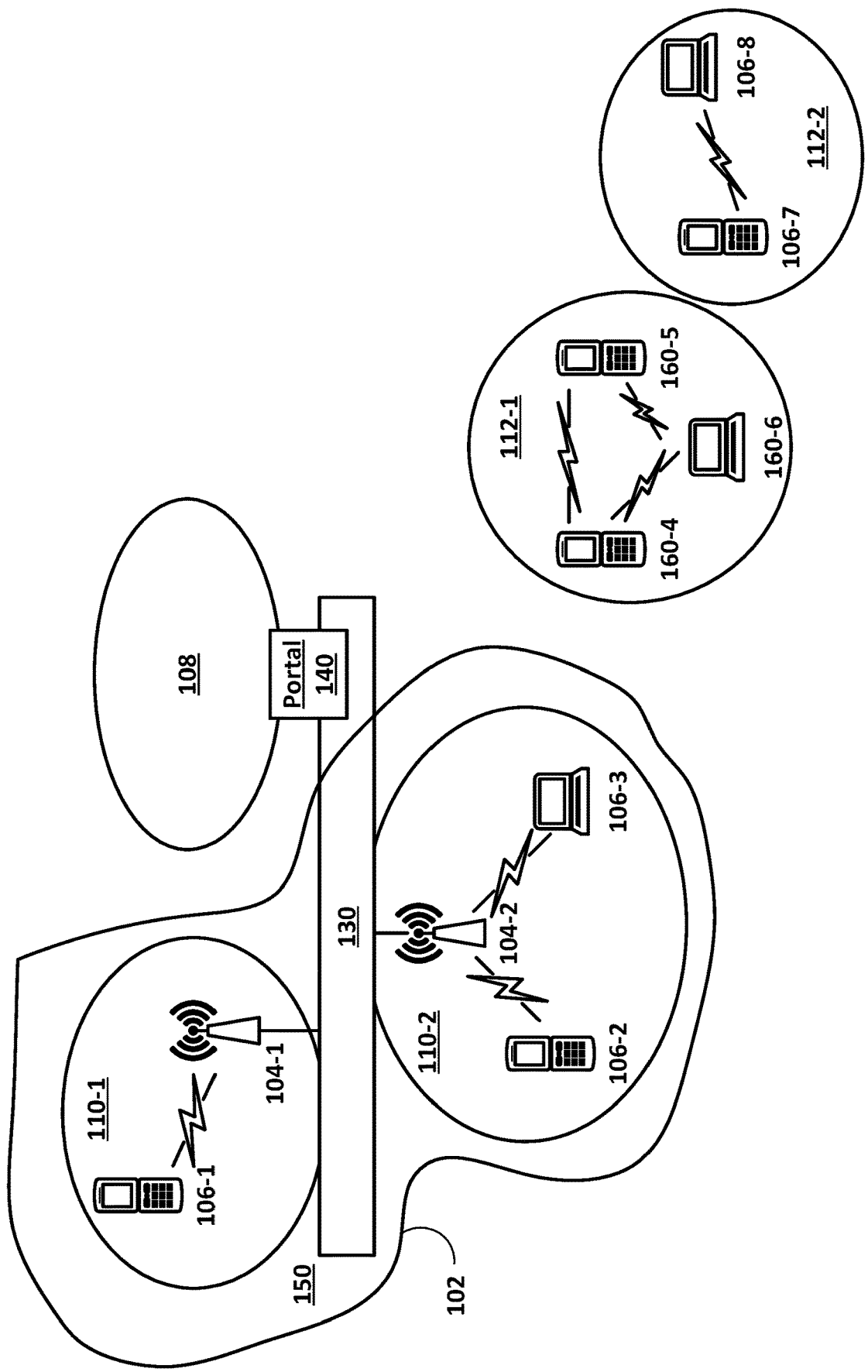
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PLCP service data unit (PSDU). For example, the PSDU may include a PHY Convergence Protocol (PLCP) preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHz, 5 GHz, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 520 MHz by bonding together multiple 20 MHz channels.

Figure 2:
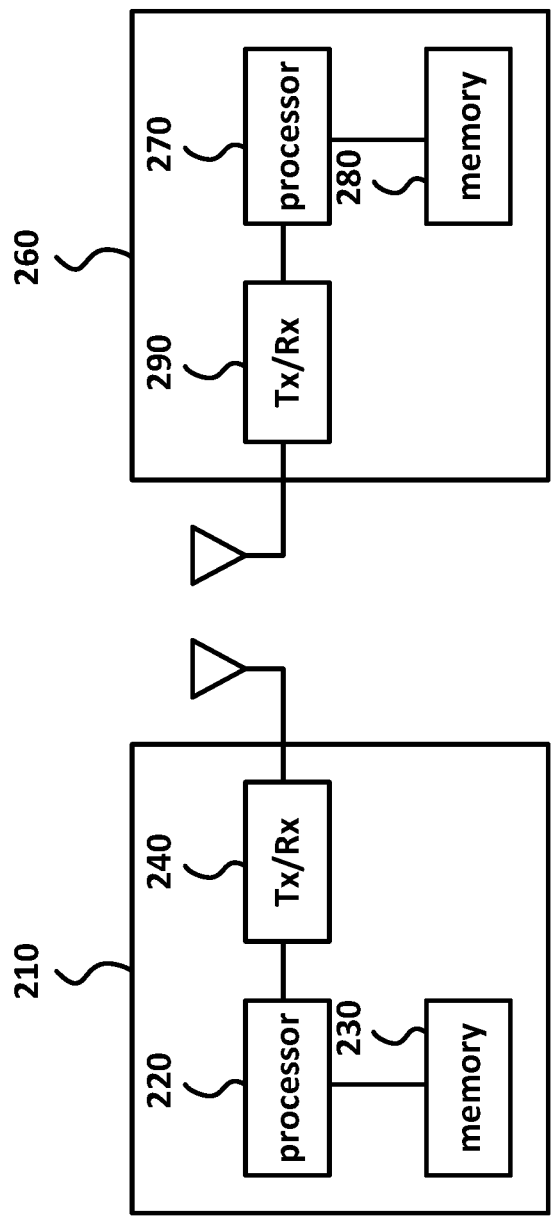
FIG. 2 is a block diagram illustrating example implementations of a station (STA) and an access point (AP).

FIG. 2 is a block diagram illustrating example implementations of a STA 210 and an AP 260. As shown in FIG. 2, STA 210 may include at least one processor 220, a memory 230, and at least one transceiver 240. AP 260 may include at least one processor 270, memory 280, and at least one transceiver 290. Processor 220/270 may be operatively connected to transceiver 240/290.

Transceiver 240/290 may be configured to transmit/receive radio signals. In an embodiment, transceiver 240/290 may implement a PHY layer of the corresponding device (STA 210 or AP 260).

In an embodiment, STA 210 and/or AP 260 may be a multi-link device (MLD), that is a device capable of operating over multiple links as defined by the IEEE 802.11be standard amendment. As such, STA 210 and/or AP 260 may each have multiple PHY layers. The multiple PHY layers may be implemented using one or more of transceivers 240/290.

Processor 220/270 may implement functions of the PHY layer, the MAC layer, and/or the logical link control (LLC) layer of the corresponding device (STA 210 or AP 260).

Processor 220/270 and/or transceiver 240/290 may include application specific integrated circuit (ASIC), other chipset, logic circuit and/or data processor. Memory 230/280 may include read-only memory (ROM), random access memory (RAM), flash memory, memory card, storage medium and/or other storage unit.

When the embodiments are executed by software, the techniques (or methods) described herein can be executed with modules (e.g., processes, functions, and so on) that perform the functions described herein. The modules can be stored in memory 230/280 and executed by processor 220/270. Memory 230/280 may be implemented (or positioned) within processor 220/270 or external to processor 220/270. Memory 230/280 may be operatively connected to processor 220/270 via various means known in the art.

Figure 3:
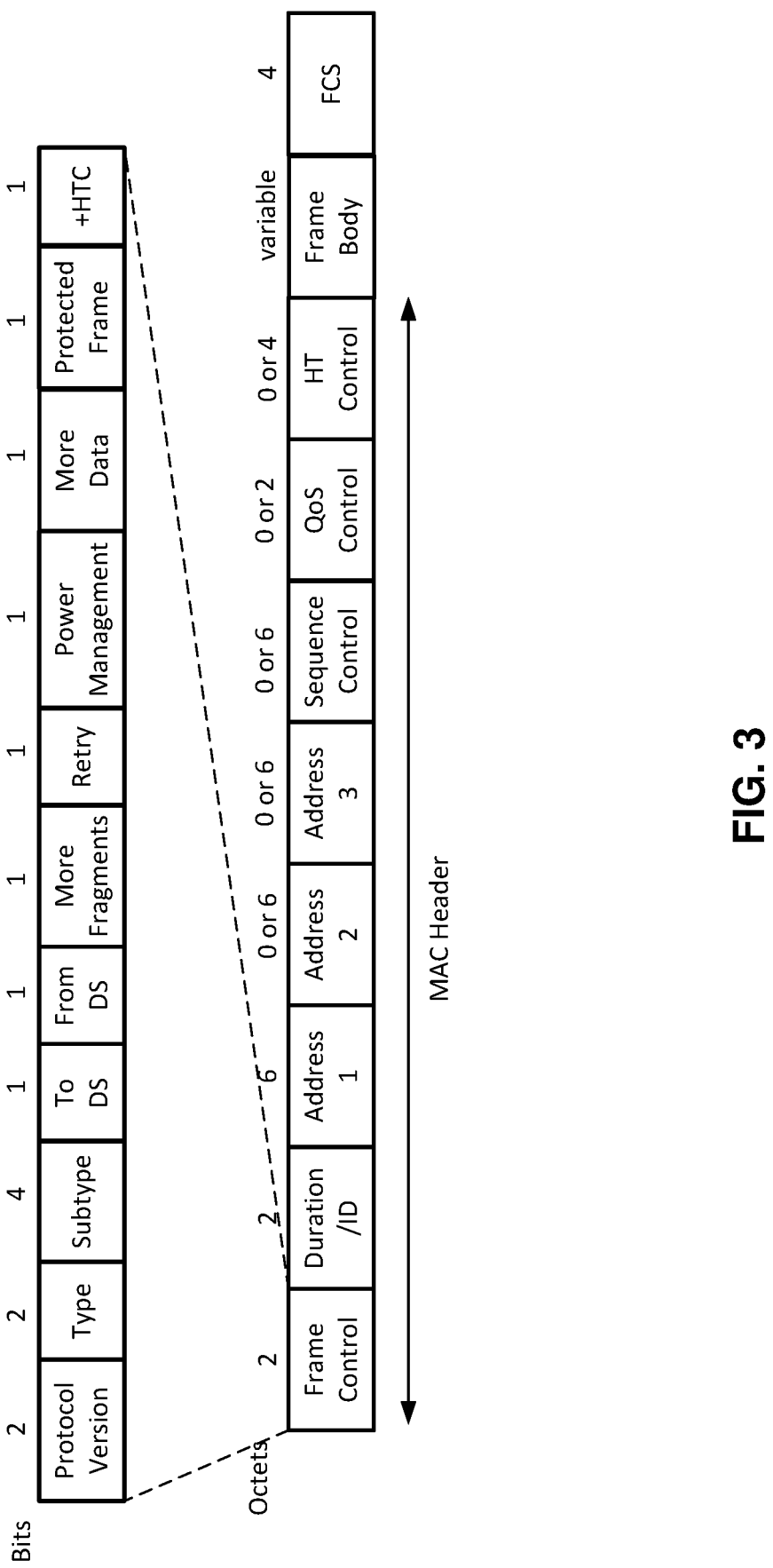
FIG. 3 illustrates an example of a Medium Access Control (MAC) frame format.

FIG. 3 illustrates an example format of a MAC frame. In operation, a STA may construct a subset of MAC frames for transmission and may decode a subset of received MAC frames upon validation. The particular subsets of frames that a STA may construct and/or decode may be determined by the functions supported by the STA. A STA may validate a received MAC frame using the frame check sequence (FCS) contained in the frame and may interpret certain fields from the MAC headers of all frames.

As shown in FIG. 3, a MAC frame includes a MAC header, a variable length frame body, and a frame check sequence (FCS).

The MAC header includes a frame control field, an optional duration/ID field, address fields, an optional sequence control field, an optional QoS control field, and an optional HT control field.

The frame control fields include the following subfields: protocol version, type, subtype, To DS, From DS, more fragments, retry, power management, more data, protected frame, and +HTC.

The protocol version subfield is invariant in size and placement across all revisions of the IEEE 802.11 standard. The value of the protocol version subfield is 0 for MAC frames.

The type and subtype subfields together identify the function of the MAC frame. There are three frame types: control, data, and management. Each of the frame types has several defined subtypes. Bits within the subtype subfield are used to indicate a specific modification of the basic data frame (subtype 0). For example, in data frames, the most significant bit (MSB) of the subtype subfield, bit 7 (B7) of the frame control field, is defined as the QoS subfield. When the QoS subfield is set to 1, it indicates a QoS subtype data frame, which is a data frame that contains a QoS control field in its MAC header. The second MSB of the subtype field, bit 6 (B6) of the frame control field, when set to 1 in data subtypes, indicates a data frame that contain no frame body field.

The To DS subfield indicates whether a data frame is destined to the distribution system (DS). The From DS subfield indicates whether a data frame originates from the DS.

The more fragments subfield is set to 1 in all data or management frames that have another fragment to follow of the MAC service data unit (MSDU) or MAC management protocol data unit (MMPDU) carried by the MAC frame. It is set to 0 in all other frames in which the more fragments subfield is present.

The retry subfield is set to 1 in any data or management frame that is a retransmission of an earlier frame. It is set to 0 in all other frames in which the retry subfield is present. A receiving STA uses this indication to aid it in the process of eliminating duplicate frames. These rules do not apply for frames sent by a STA under a block agreement.

The power management subfield is used to indicate the power management mode of a STA.

The More Data subfield indicates to a STA in power save (PS) mode that bufferable units (Bus) are buffered for that STA at the AP. The more data subfield is valid in individually addressed data or management frames transmitted by an AP to a STA in PS mode. The more data subfield is set to 1 to indicate that at least one additional buffered BU is present for the STA.

The protected frame subfield is set to 1 if the frame body field contains information that has been processed by a cryptographic encapsulation algorithm.

The +HTC subfield indicates that the MAC frame contains an HT control field.

The duration/ID field of the MAC header indicates various contents depending on frame type and subtype and the QoS capabilities of the sending STA. For example, in control frames of the power save poll (PS-Poll) subtype, the duration/ID field carries an association identifier (AID) of the STA that transmitted the frame in the 14 least significant bits (LSB), and the 2 most significant bits (MSB) are both set to 1. In other frames sent by STAs, the duration/ID field contains a duration value (in microseconds) which is used by a recipient to update a network allocation vector (NAV). The NAV is a counter that it indicates to a STA an amount of time during which it must defer from accessing the shared medium.

There can be up to four address fields in the MAC frame format. These fields are used to indicate the basic service set identifier (BSSID), source address (SA), destination address (DA), transmitting address (TA), and receiving address (RA). Certain frames might not contain some of the address fields. Certain address field usage may be specified by the relative position of the address field (1-4) within the MAC header, independent of the type of address present in that field. Specifically, the address 1 field always identifies the intended receiver(s) of the frame, and the address 2 field, where present, always identifies the transmitter of the frame.

The sequence control field includes two subfields, a sequence number subfield and a fragment number subfield. The sequence number subfield in data frames indicates the sequence number of the MSDU (if not in an Aggregated MSDU (A-MSDU)) or A-MSDU. The sequence number subfield in management frames indicates the sequence number of the frame. The fragment number subfield indicates the number of each fragment of an MSDU or MMPDU. The fragment number is set to 0 in the first or only fragment of an MSDU or MMPDU and is incremented by one for each successive fragment of that MSDU or MMPDU. The fragment number is set to 0 in a MAC protocol data unit (MPDU) containing an A-MSDU, or in an MPDU containing an MSDU or MMPDU that is not fragmented. The fragment number remains constant in all retransmissions of the fragment.

The QoS control field identifies the traffic category (TC) or traffic stream (TS) to which the MAC frame belongs. The QoS control field may also indicate various other QoS related, A-MSDU related, and mesh-related information about the frame. This information can vary by frame type, frame subtype, and type of transmitting STA. The QoS control field is present in all data frames in which the QoS subfield of the subtype subfield is equal to 1.

The HT control field is present in QoS data, QoS null, and management frames as determined by the +HTC subfield of the frame control field.

The frame body field is a variable length field that contains information specific to individual frame types and subtypes. It may include one or more MSDUs or MMPDUs. The minimum length of the frame body is 0 octets.

The FCS field contains a 32-bit Cyclic Redundancy Check (CRC) code. The FCS field value is calculated over all of the fields of the MAC header and the frame body field.

Figure 4:
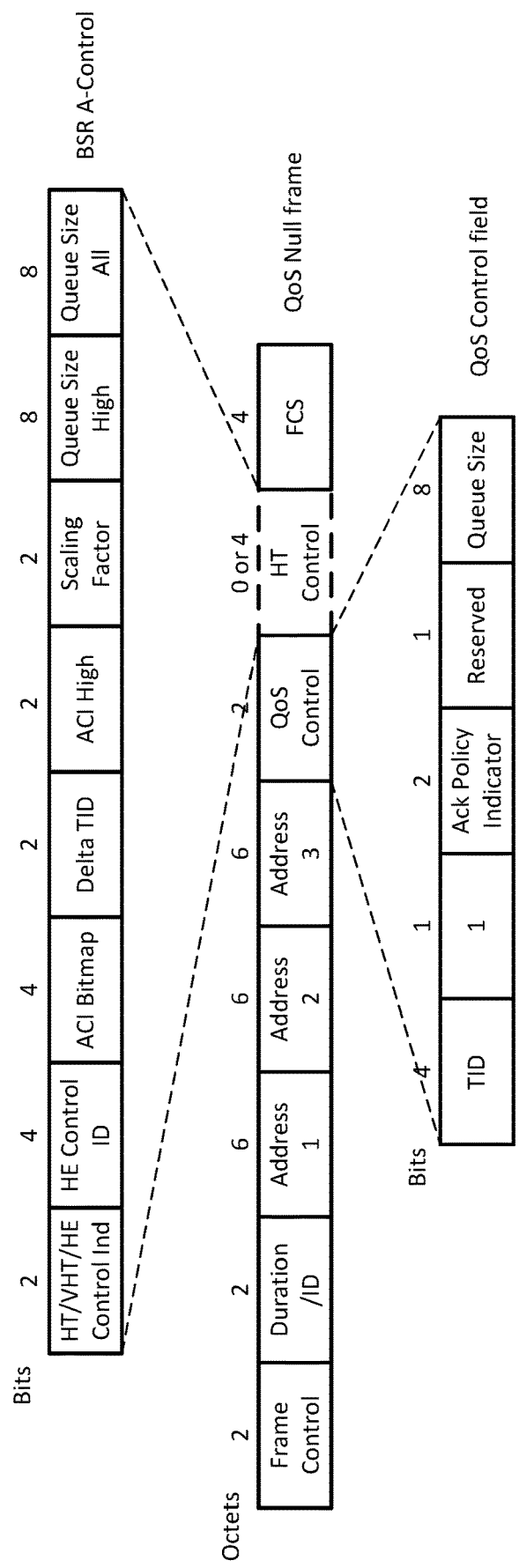
FIG. 4 illustrates an example of a Quality of Service (QoS) null frame indicating buffer status information.

FIG. 4 illustrates an example of a QoS null frame indicating buffer status information. A QoS null frame refers to a QoS data frame with an empty frame body. A QoS null frame includes a QoS control field and an optional HT control field which may contain a buffer status report (BSR) control subfield. A QoS null frame indicating buffer status information may be transmitted by a STA to an AP.

The QoS control field may include a traffic identifier (TID) subfield, an ack policy indicator subfield, and a queue size subfield (or a transmission opportunity (TXOP) duration requested subfield).

The TID subfield identifies the TC or TS of traffic for which a TXOP is being requested, through the setting of the TXOP duration requested or queue size subfield. The encoding of the TID subfield depends on the access policy (e.g., Allowed value 0 to 7 for enhanced distributed channel access (EDCA) access policy to identify user priority for either TC or TS).

The ack policy indicator subfield, together with other information, identifies the acknowledgment policy followed upon delivery of the MPDU (e.g., normal ack, implicit block ack request, no ack, block ack, etc.)

The queue size subfield is an 8-bit field that indicates the amount of buffered traffic for a given TC or TS at the STA for transmission to the AP identified by the receiver address of the frame containing the subfield. The queue size subfield is present in QoS null frames sent by a STA when bit 4 of the QoS control field is set to 1. The AP may use information contained in the queue size subfield to determine t TXOP duration assigned to the STA or to determine the uplink (UL) resources assigned to the STA.

In a frame sent by or to a non-High Efficiency (non-HE) STA, the following rules may apply to the queue size value:

The queue size value is the approximate total size, rounded up to the nearest multiple of 256 octets and expressed in units of 256 octets, of all MSDUs and A-MSDUs buffered at the STA (excluding the MSDU or A-MSDU contained in the present QoS Data frame) in the delivery queue used for MSDUs and A-MSDUs with TID values equal to the value indicated in the TID subfield of the QoS Control field.

A queue size value of 0 is used solely to indicate the absence of any buffered traffic in the queue used for the specified TID.

A queue size value of 254 is used for all sizes greater than 64 768 octets.

A queue size value of 255 is used to indicate an unspecified or unknown size.

In a frame sent by an HE STA to an HE AP, the following rules may apply to the queue size value.

The queue size value, QS, is the approximate total size in octets, of all MSDUs and A-MSDUs buffered at the STA (including the MSDUs or A-MSDUs contained in the same PSDU as the frame containing the queue size subfield) in the delivery queue used for MSDUs and A-MSDUs with TID values equal to the value indicated in the TID subfield of the QoS control field.

The queue size subfield includes a scaling factor subfield in bits B14-B15 of the QoS control field and an unscaled value, UV, in bits B8-B13 of the QoS control field. The scaling factor subfield provides the scaling factor, SF.

A STA obtains the queue size, QS, from a received QoS control field, which contains a scaling factor, SF, and an unscaled value, UV, as follows:

QS=

16×UV, if SF is equal to 0;

1024+256×UV, if SF is equal to 1;

17 408+2048×UV, if SF is equal to 2;

148 480+32 768×UV, if SF is equal to 3 and UV is less than 62;

>2 147 328, if SF equal to is 3 and UV is equal to 62;

Unspecified or Unknown, if SF is equal to 3 and UV is equal to 63.

The TXOP duration requested subfield, which may be included instead of the queue size subfield, indicates the duration, in units of 32 microseconds (us), that the sending STA determines it needs for its next TXOP for the specified TID. The TXOP duration requested subfield is set to 0 to indicate that no TXOP is requested for the specified TID in the current service period (SP). The TXOP duration requested subfield is set to a nonzero value to indicate a requested TXOP duration in the range of 32 us to 8160 us in increments of 32 us.

The HT control field may include a BSR control subfield which may contain buffer status information used for UL MU operation. The BSR control subfield may be formed from an access category index (ACI) bitmap subfield, a delta TID subfield, an ACI high subfield, a scaling factor subfield, a queue size high subfield, and a queue size all subfield of the HT control field.

The ACI bitmap subfield indicates the access categories for which buffer status is reported (e.g., B0: best effort (AC_BE), B1: background (AC_BK), B2: video (AC_VI), B3: voice (AC_VO), etc.). Each bit of the ACI bitmap subfield is set to 1 to indicate that the buffer status of the corresponding AC is included in the queue size all subfield, and set to 0 otherwise, except that if the ACI bitmap subfield is 0 and the delta TID subfield is 3, then the buffer status of all 8 TIDs is included.

The delta TID subfield, together with the values of the ACI bitmap subfield, indicate the number of TIDs for which the STA is reporting the buffer status.

The ACI high subfield indicates the ACI of the AC for which the BSR is indicated in the queue size high subfield. The ACI to AC mapping is defined as ACI value 0 mapping to AC_BE, ACI value 1 mapping to AC_BK, ACI value 2 mapping to AC_VI, and ACI value 3 mapping to AC_VO.

The scaling factor subfield indicates the unit SF, in octets, of the queue size high and queue size all subfields.

The queue size high subfield indicates the amount of buffered traffic, in units of SF octets, for the AC identified by the ACI high subfield, that is intended for the STA identified by the receiver address of the frame containing the BSR control subfield.

The queue size all subfield indicates the amount of buffered traffic, in units of SF octets, for all Acs identified by the ACI Bitmap subfield, that is intended for the STA identified by the receiver address of the frame containing the BSR control subfield.

The queue size values in the queue size high and queue size all subfields are the total sizes, rounded up to the nearest multiple of SF octets, of all MSDUs and A-MSDUs buffered at the STA (including the MSDUs or A-MSDUs contained in the same PSDU as the frame containing the BSR control subfield) in delivery queues used for MSDUs and A-MSDUs associated with AC(s) that are specified in the ACI high and ACI bitmap subfields, respectively.

A queue size value of 254 in the queue size high and queue size all subfields indicates that the amount of buffered traffic is greater than 254×SF octets. A queue size value of 255 in the queue size high and queue size all subfields indicates that the amount of buffered traffic is an unspecified or unknown size. The queue size value of QoS data frames containing fragments may remain constant even if the amount of queued traffic changes as successive fragments are transmitted.

MAC service provides peer entities with the ability to exchange MSDUs. To support this service, a local MAC uses the underlying PHY-level service to transport the MSDUs to a peer MAC entity. Such asynchronous MSDU transport is performed on a connectionless basis.

Figure 5:
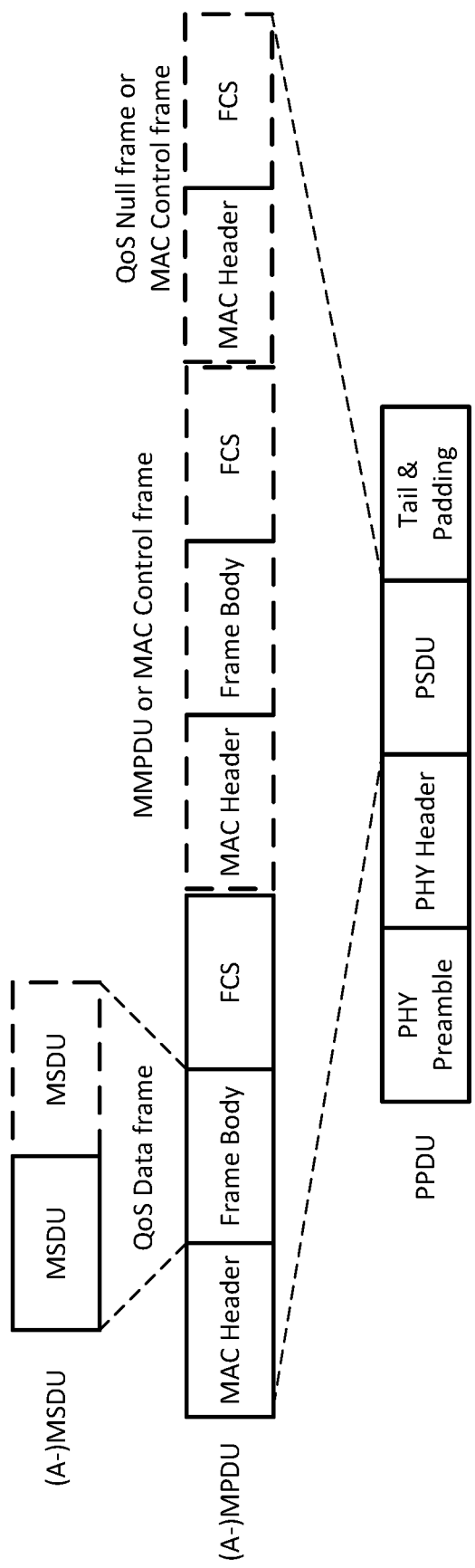
FIG. 5 illustrates an example format of a physical layer (PHY) protocol data unit (PPDU).

FIG. 5 illustrates an example format of a PPDU. As shown, the PPDU may include a PHY preamble, a PHY header, a PSDU, and tail and padding bits.

The PSDU may include one or more MPDUs, such as a QoS data frame, an MMPDU, a MAC control frame, or a QoS null frame. In the case of an MPDU carrying a QoS data frame, the frame body of the MPDU may include a MSDU or an A-MSDU.

By default, MSDU transport is on a best-effort basis. That is, there is no guarantee that a transmitted MSDU will be delivered successfully. However, the QoS facility uses a traffic identifier (TID) to specify differentiated services on a per-MSDU basis.

A STA may differentiate MSDU delivery according to designated traffic category (TC) or traffic stream (TS) of individual MSDUs. The MAC sublayer entities determine a user priority (UP) for an MSDU based on a TID value provided with the MSDU. The QoS facility supports eight UP values. The UP values range from 0 to 7 and form an ordered sequence of priorities, with 1 being the lowest value, 7 the highest value, and 0 falling between 2 and 3.

An MSDU with a particular UP is said to belong to a traffic category with that UP. The UP may be provided with each MSDU at the medium access control service access point (MAC SAP) directly in a UP parameter. An A-MPDU may include MPDUs with different TID values.

A STA may deliver buffer status reports (BSRs) to assist an AP in allocating UL MU resources. The STA may either implicitly deliver BSRs in the QoS control field or BSR control subfield of any frame transmitted to the AP (unsolicited BSR) or explicitly deliver BSRs in a frame sent to the AP in response to a BSRP Trigger frame (solicited BSR).

The buffer status reported in the QoS control field includes a queue size value for a given TID. The buffer status reported in the BSR control field includes an ACI bitmap, delta TID, a high priority AC, and two queue sizes.

A STA may report buffer status to the AP, in the QoS control field, of transmitted QoS null frames and QoS data frames and, in the BSR control subfield (if present), of transmitted QoS null frames, QoS data frames, and management frames as defined below.

The STA may report the queue size for a given TID in the queue size subfield of the QoS control field of transmitted QoS data frames or QoS null frames; the STA may set the queue size subfield to 255 to indicate an unknown/unspecified queue size for that TID. The STA may aggregate multiple QoS data frames or QoS null frames in an A-MPDU to report the queue size for different TIDs.

The STA may report buffer status in the BSR control subfield of transmitted frames if the AP has indicated its support for receiving the BSR control subfield.

A High-Efficiency (HE) STA may report the queue size for a preferred AC, indicated by the ACI high subfield, in the queue size high subfield of the BSR control subfield. The STA may set the queue size high subfield to 255 to indicate an unknown/unspecified queue size for that AC.

A HE STA may report the queue size for ACs indicated by the ACI bitmap subfield in the queue size all subfield of the BSR control subfield. The STA may set the queue size all subfield to 255 to indicate an unknown/unspecified BSR for those ACs.

Figure 6:
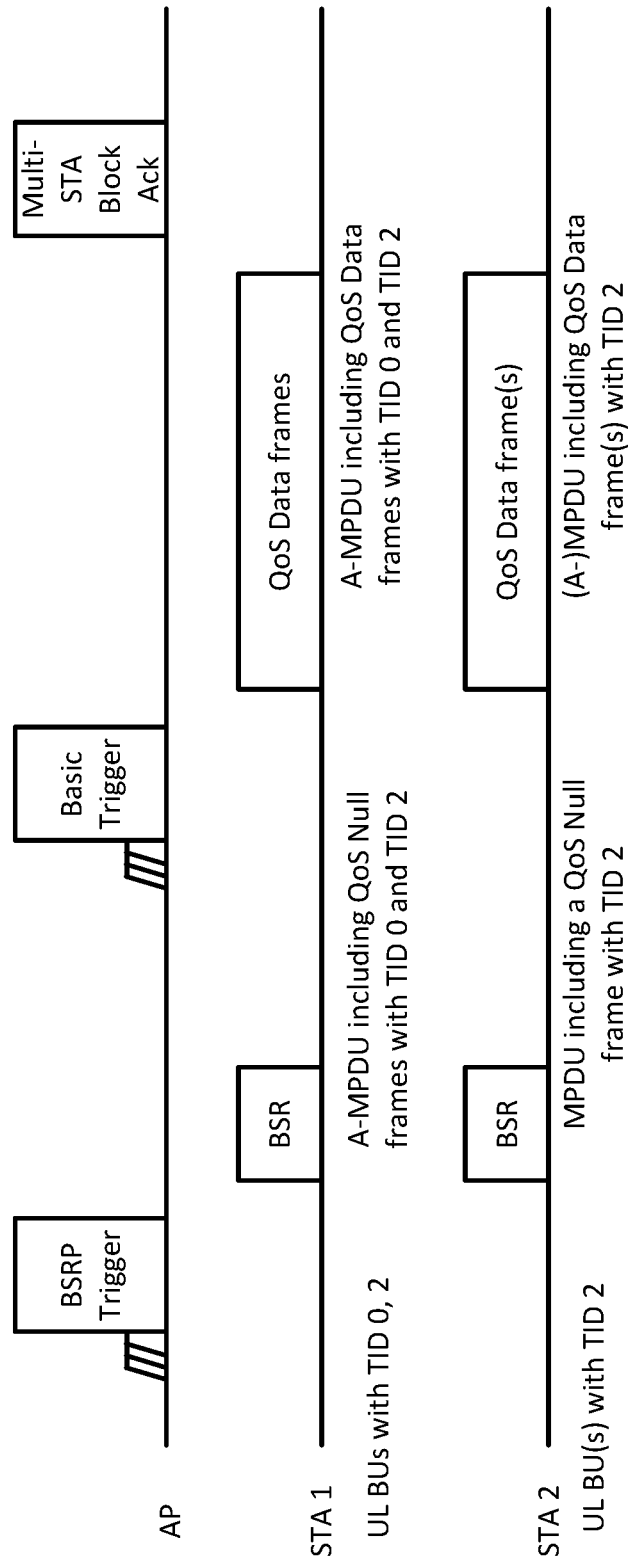
FIG. 6 illustrates an example that includes buffer status reporting by STAs, scheduling by an AP of uplink multi-user (MU) transmissions, and transmission of scheduled uplink transmissions by the STAs.

FIG. 6 illustrates an example that includes buffer status reporting by STAs, scheduling by an AP of uplink multi-user (MU) transmissions, and transmission of scheduled uplink transmissions by the STAs.

As shown, the AP may solicit one or more associated STAs (STA 1 and STA 2) for buffer status by sending a buffer status report poll (BSRP) trigger frame. Upon receiving the BSRP trigger frame, STA 1 and/or STA 2 may each generate a trigger-based (TB) PPDU if the BSRP trigger frame contains, in a User Info field, the 12 LSBs of the STA's AID.

STA 1 and/or STA 2 may each include in the TB PPDU one or more QoS null frames. The one or more QoS null frames may contain one or more QoS control fields or one or more BSR control subfields.

As described earlier, a QoS control field may include a queue size subfield for a TID for which the STA has a queue size to report to the AP. For example, as shown in FIG. 6, STA 1 may respond to the BSRP trigger frame from the AP by transmitting an A-MPDU including multiple QoS null frames. The QoS null frames each indicates, in its respective QoS control field, a queue size for a respective TID, e.g. TID 0 and TID 2. Similarly, STA 2 may respond to the BSRP trigger frame by transmitting an MPDU including a QoS null frame, which indicates a queue size for TID 2 in its QoS control field.

A BSR control subfield may include a queue size all subfield indicating the queue size for the ACs, indicated by the ACI bitmap subfield, for which the STA has a queue size to report to the AP if the AP has indicated its support for receiving the BSR control subfield. The STA sets a delta TID, a scaling factor, an ACI high, and the queue size high subfields of the BSR Control subfield.

On receiving the BSRs from STA 1 and STA 2, the AP may transmit a basic trigger frame to allocate UL MU resources to STA 1 and STA 2. In response, STA 1 may transmit a TB PPDU containing QoS data frames with TID 0 and TID 2 and STA 2 may transmit a TB PPDU containing one or more QoS data frame(s) with TID. The AP may acknowledge the transmitted TB PPDUs from STA 1 and STA 2 by sending a multi-STA block ack frame.

Figure 7:
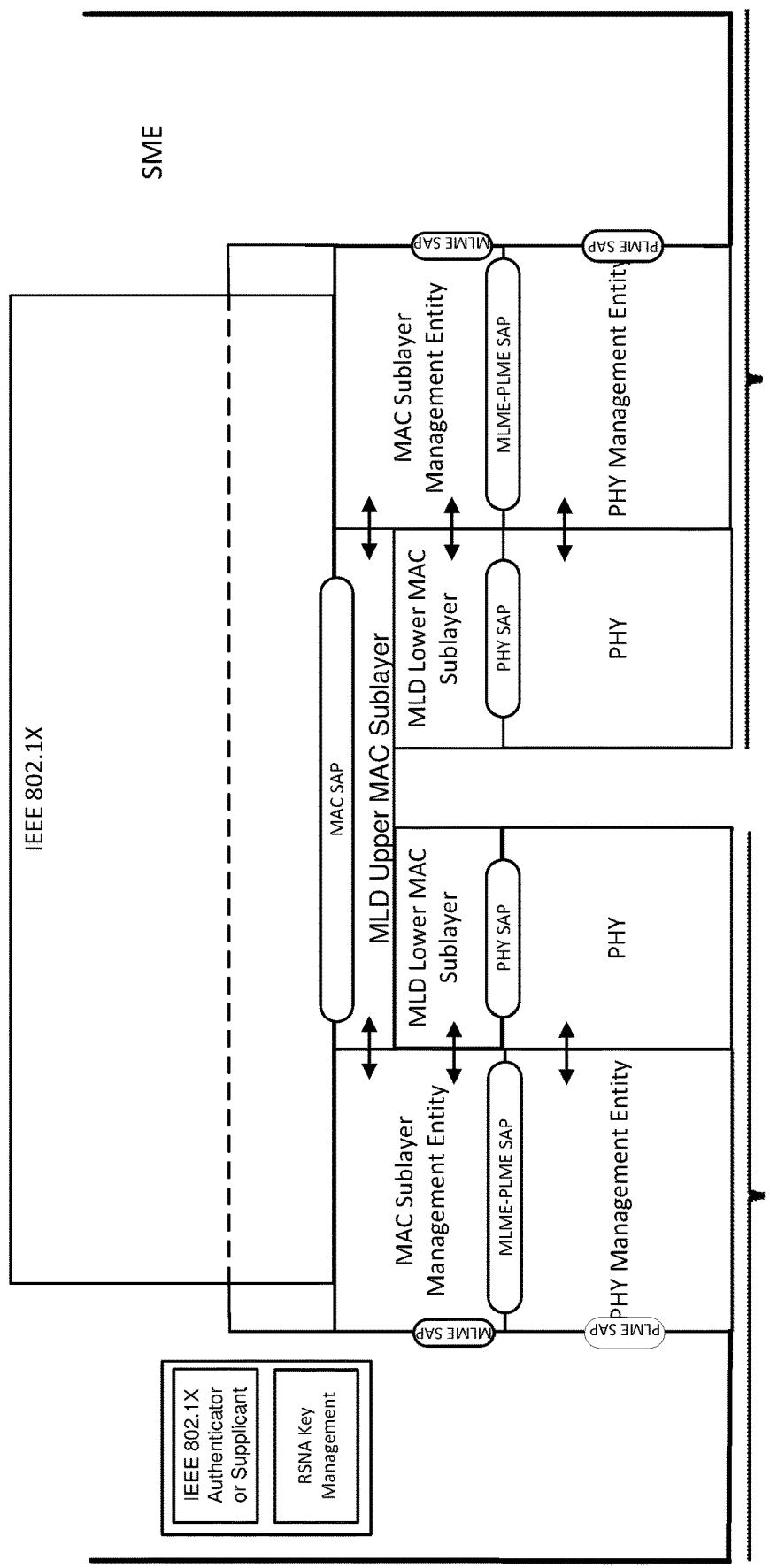
FIG. 7 illustrates an example reference model for a multi-link device (MLD).

FIG. 7 illustrates an example reference model for a multi-link device (MLD).

An MLD is an entity capable of managing communication over multiple links. The MLD may be a logical entity and may have more than one affiliated station (STA). An MLD may be an access point MLD (AP MLD) where a STA affiliated with the MLD is an AP STA (or an AP). An MLD may be a non-access point MLD (non-AP MLD) where a STA affiliated with the MLD is a non-AP STA (or an STA).

Communication across different frequency bands/channels may occur simultaneously, or not, depending on the capabilities of both of the communicating AP MLD and non-AP MLD.

As shown in FIG. 7, a MLD may have a single MAC service access point (MAC-SAP) to the LLC layer, which includes a MAC data service. The MLD may support multiple MAC sublayers, coordinated by a sublayer management entity (SME). Each AP STA (or non-AP STA) affiliated with an AP MLD (or non-AP MLD) has a different MAC address within the MLD.

The SME is responsible for coordinating the MAC sublayer management entities (MLMEs) of the affiliated STAs of the MLD to maintain a single robust security network association (RSNA) key management entity as well as a single IEEE 802.1X Authenticator or Supplicant for multi-link operation (MLO).

Multi-link operation (MLO) procedures allow a pair of MLDs to discover, synchronize, (de)authenticate, (re)associate, disassociate, and manage resources with each other on any common bands or channels that are supported by both MLDs. The Authenticator and the MAC-SAP of an AP MLD may be identified by the same AP MLD MAC address. The Supplicant and the MAC-SAP of a non-AP MLD may be identified by the same non-AP MLD MAC address.

Figure 8:
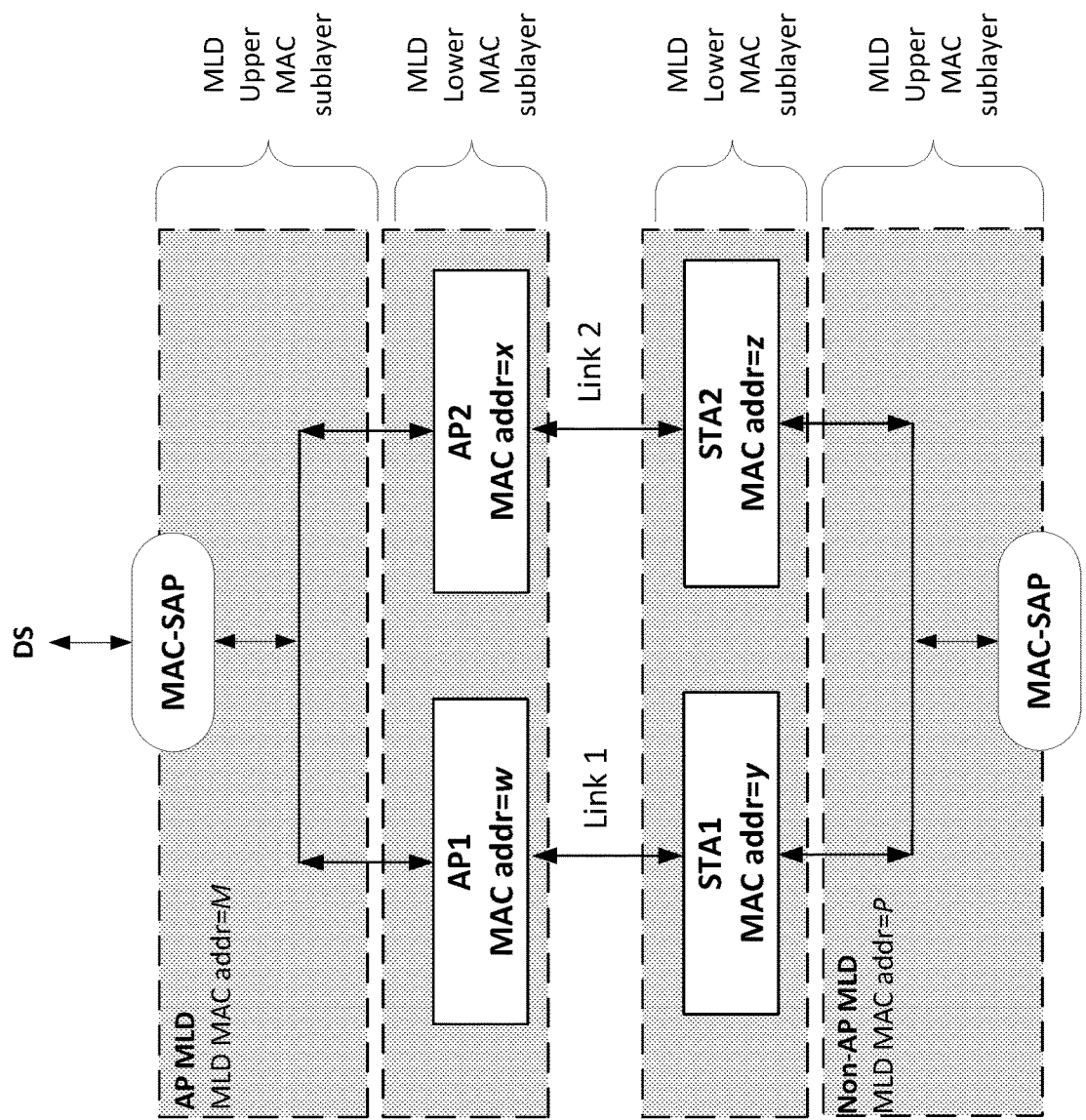
FIG. 8 illustrates an example of an AP MLD and an associated non-AP MLD.

FIG. 8 illustrates an example of an AP MLD and an associated non-AP MLD.

As shown, the AP MLD has two affiliated APs (AP1 and AP2), and the non-AP MLD has two affiliated STAs (STA 1 and STA 2). The AP MLD and the non-AP MLD may be communicatively coupled by two links (Link 1 and Link 2.) Link 1 is established between AP1 and STA1, and link 2 is established between AP2 and STA2.

Generally, the MAC addresses of an MLD and of its affiliated STAs are different from one another. For example, as shown in FIG. 8, the AP MLD may have MAC address M, AP 1 may have MAC address w, and AP2 may have with MAC address x. Similarly, the non-AP MLD may have MAC address P, STA 1 may have MAC address y, and STA2 may have MAC address z.

As shown in FIG. 8, with each MLD, the MAC sublayer may be further divided into an MLD upper MAC sublayer and an MLD lower MAC sublayer. The MLD upper MAC sublayer (MLD) performs functionalities that are common across all links. The MLD lower MAC sublayer performs functionalities that are local to each link. Some of the functionalities require joint processing of both the MLD upper and the MLD lower MAC sublayers.

The MLD upper MAC sublayer functions may include:
Authentication, association, and reassociation (between an AP MLD and a non-AP MLD);
Security association (e.g., pairwise master key security association (PMKSA), pairwise transient key security association (PTKSA)) and distribution of group temporal key (GTK)/integrity GTK (IGTK)/beacon IGTK (BIGTK);
Sequence number (SN)/packet number (PN) assignment for frames to be encrypted by pairwise transient key (PTK) for unicast frames;
Encryption/decryption using PTK for unicast frames;
Selection of the MLD lower MAC sublayer for transmission (TID-to-link mapping);
Reordering of packets to ensure in-order delivery per each Block Ack session;
Block Ack scoreboarding for individually addressed frames (in collaboration with the MLD lower MAC sublayer); optionally, the MLD upper MAC sublayer delivers the Block Ack record on one link to the MLD lower MAC sublayer of other links; and
MLD level management information exchange/indication via the MLD lower MAC sublayer The MLD lower MAC sublayer functions may include:
Maintenance of link specific GTK/IGTK/BIGTK (between an AP affiliated with the AP MLD and a STA affiliated with the non-AP MLD);
Link-specific encryption/decryption/integrity protection and PN assignment using GTK/IGTK/BIGTK (between an AP affiliated with the AP MLD and a STA affiliated with the non-AP MLD);
Link specific management information exchange/indication (e.g., beacon);
Link specific control information exchange/indication (e.g., RTS/CTS, acknowledgements, etc.);
Power save state and mode;
MAC address filtering for frame reception; and
Block Ack scoreboarding for individually addressed frames (in collaboration with the MLD upper MAC sublayer); optionally, the MLD lower MAC sublayer receives the Block Ack record on the other links from the MLD upper MAC sublayer.

Multi-link (re)setup between a non-AP MLD and an AP MLD may include an exchange of (re)association request/ response frames. A (re)association request/response frame exchange for a multi-link setup may include both frames carrying a basic multi-link element.

In the (re)association request frame, the non-AP MLD indicates the links that are requested for (re)setup and the capabilities and operational parameters of the requested links. The non-AP MLD may request to (re)set up links with a subset of APs affiliated with the AP MLD. The links that are requested for (re)setup and the capabilities and operation parameters of requested links are independent of existing setup links with an associated AP MLD and the capabilities and operation parameters of setup links.

In the (re)association response frame, the AP MLD may indicate the requested links that are accepted and the requested links that are rejected for (re)setup and the capabilities and operational parameters of the requested links. The AP MLD may accept a subset of the links that are requested for (re)setup. The (re)association response frame is sent to the non-AP STA, affiliated with the non-AP MLD, that sent the (re)association request frame.

An MLD that requests or accepts multi-link (re)setup for any two links ensures that each link is located on a different nonoverlapping channel. After successful multi-link (re) setup between a non-AP MLD and an AP MLD, the non-AP MLD and the AP MLD set up links for multi-link operation, and the non-AP MLD is (re)associated with the AP MLD. For each setup link, the corresponding non-AP STA affiliated with the non-AP MLD is in the same associated state as the non-AP MLD and is associated with a corresponding AP affiliated with the AP MLD. For each setup link, functionalities between a non-AP STA and its associated AP are enabled unless the functionalities have been extended to the MLD level or specified otherwise.

Figure 9:
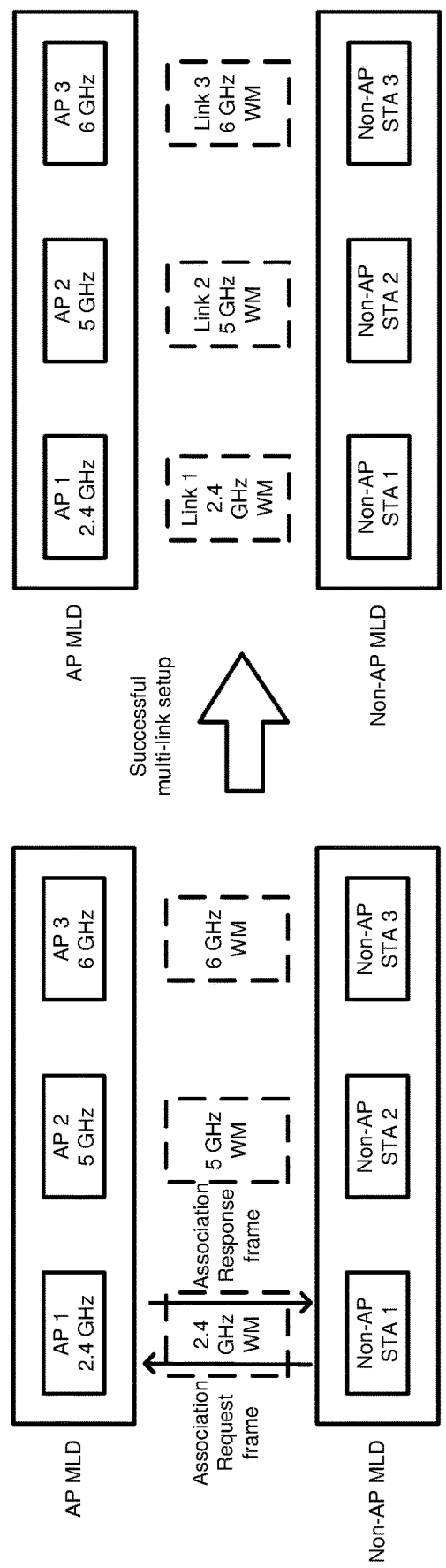
FIG. 9 illustrates an example of a multi-link setup between an AP MLD and a non-AP MLD.

FIG. 9 illustrates an example of a multi-link setup between an AP MLD and a non-AP MLD. As shown, the AP MLD has three affiliated APs: AP 1 operating in the 2.4 GHz band, AP 2 operating in the 5 GHz band, and AP 3 operating in the 6 GHz band. The non-AP MLD has three affiliated STAs: non-AP STA 1 operating in the 2.4 GHz band, non-AP STA 2 operating in the 5 GHz band, and non-AP STA 3 operating in the 6 GHz band.

The non-AP MLD may initiate multi-link setup by non-AP STA 1 sending an association request frame to AP 1 affiliated with the AP MLD. In the association request frame, the transmitter address (TA) field is set to the MAC address of non-AP STA 1 and the receiver address (RA) field is set to the MAC address of AP 1. The association request frame includes a basic multi-link element that indicates the MLD MAC address of the non-AP MLD and complete information of non-AP STA 1, non-AP STA 2, and non-AP STA 3. The association request frame may request the setup of three links between the non-AP MLD and the AP MLD (a link between AP 1 and non-AP STA 1, a link between AP 2 and non-AP STA 2, and a link between AP 3 and non-AP STA 3).

The AP MLD may respond to the requested multi-link setup by AP sending an association response frame to non-AP STA 1 affiliated with the non-AP MLD. In the association response frame, the TA field is set to the MAC address of the AP 1 and the RA field is set to the MAC address of the non-AP STA 1. The association response frame includes a basic multi-link element that indicates the MLD MAC address of the AP MLD and complete information of AP 1, AP 2, and AP 3. The association response frame signals successful multi-link setup by the setup of three links between the non-AP MLD and AP MLD (link 1 between AP 1 and non-AP STA 1, link 2 between AP 2 and non-AP STA 2, and link 3 between AP 3 and non-AP STA 3).

By default, all TIDs at the non-AP MLD are mapped to all setup links for both uplink and downlink. The TID-to-link mapping mechanism allows an AP MLD and a non-AP MLD that performed or are performing multi-link setup to specify how UL and DL QoS traffic corresponding to different TIDs (e.g., between 0 and 7) may be assigned to the setup links. In a negotiated TID-to-link mapping, a TID may be mapped to a link set, which is a subset of setup links, ranging from a single setup link to all the setup links.

A setup link is defined as enabled for a non-AP MLD if at least one TID is mapped to that link either in DL or in UL, and is defined as disabled if no TIDs are mapped to that link both in DL and UL. At any point in time, a TID is always mapped to at least one setup link both in DL and UL, which means that a TID-to-link mapping change can only be valid and successful if it does not result in a TID having a mapped link set made of zero setup links.

By default, all setup links are enabled. If a link is enabled for a non-AP MLD, it may be used for the exchange of individually addressed frames, subject to the power state of the non-AP STA operating on that link. Only MSDUs or A-MSDUs with TIDs mapped to a link may be transmitted on that link in the direction (DL/UL) corresponding to the TID-to-link mapping. Individually addressed management frames and control frames may be sent on any enabled link between an affiliated STA of the non-AP MLD and a corresponding AP of the AP MLD, both in DL and UL.

If a link is disabled for a non-AP MLD, the link may not be used for the exchange of individually addressed frames between an affiliated STA of the non-AP MLD and a corresponding AP of the AP MLD.

If a TID is mapped in UL to a set of enabled links for a non-AP MLD, the non-AP MLD may use any link within this set of enabled links to transmit individually addressed MSDUs or A-MSDUs corresponding to that TID.

If a TID is mapped in DL to a set of enabled links for a non-AP MLD, the non-AP MLD may retrieve individually addressed BUs buffered at the AP MLD that are MSDUs or A-MSDUs corresponding to the TID, on any link of the set of enabled links. Conversely, the AP MLD may use any link within the set of enabled links to transmit individually addressed MSDUs or A-MSDUs corresponding to the TID, subject to the power state of the non-AP STA on each of the used link.

If the default mode is used, the non-AP MLD may retrieve BUs buffered by the AP MLD on any setup link, though the AP MLD may recommend a link.

A non-AP MLD may retrieve buffered BUs that are MMPDUs buffered at the AP MLD on any enabled link. An AP MLD may use any enabled link to transmit individually addressed bufferable management frames that are not measurement MMPDUs, subject to the power state of the non-AP STA on the used link. If a STA affiliated with a non-AP MLD is in active mode on a link with a set of TIDs mapped for DL transmission, its associated AP affiliated with the AP MLD may transmit to the STA: MSDUs/A-MSDUs for the set of mapped TIDs for the non-AP MLD; and MMPDUs that are not measurement MMPDUs for the non-AP MLD or its affiliated STAs, unless the frames are transmitted to another STA affiliated with the same non-AP MLD and in active mode.

As mentioned above, under the default mapping mode, all TIDs are mapped to all setup links for DL and UL, and all setup links are enabled. A non-AP MLD and an AP MLD that perform multi-link setup shall operate under this mode if a TID-to-link mapping negotiation for a different mapping has not occurred, was unsuccessful, or was torn down.

In a multi-link (re)setup procedure, a non-AP MLD may initiate a TID-to-link mapping negotiation by including a TID-to-link mapping element in a (re)association request frame if an AP MLD has indicated support for TID-to-link mapping negotiation. After receiving the (re)association request frame containing the TID-to-link mapping element, the AP MLD may reply to the (re)association request frame in according to the following rules. The AP MLD can accept the requested TID-to-link mapping indicated in the TID-to-link mapping element in the received (re)association request frame only if it accepts the multi-link (re)setup for all links on which at least one TID is requested to be mapped. In this case, the non-AP MLD does include in the (re)association response frame a TID-to-link mapping element. Otherwise, the non-AP MLD indicates rejection of the proposed TID-to-link mapping by including in the (re)association response frame a TID-to-link mapping element that suggests a preferred TID-to-link mapping.

Following a successful multi-link (re)setup, to negotiate a new TID-to-link mapping, an initiating MLD may send an individually addressed TID-to-link mapping request frame to a responding MLD that has indicated support of TID-to-link mapping negotiation.

On receiving the individually addressed TID-to-link mapping request frame, the responding MLD sends an individually addressed TID-to-link mapping response frame to the initiating MLD according to the following rules. The responding MLD may accept the requested TID-to-link mapping indicated in the TID-to-link mapping element in the received TID-to-link mapping request frame by transmitting a TID-to-link mapping response frame. Otherwise, the responding MLD may indicate rejection of the proposed TID-to-link mapping in the TID-to-link mapping response frame. The responding MLD may suggest a preferred TID-to-link mapping in the TID-to-link mapping response frame by including the TID-to-link mapping element in the TID-to-link mapping response frame.

An MLD may suggest a preferred TID-to-link mapping to a peer MLD by sending an unsolicited TID-to-link mapping response frame that includes a TID-to-link mapping element.

When a peer MLD indicates a preferred TID-to-link mapping, an MLD may take into account the preferred TID-to-link mapping when it initiates a new TID-to-link mapping. In addition, an AP MLD may take into account the traffic flow(s) affiliated with the non-AP MLD and the capabilities and constraints (if any) of the non-AP MLD.

When two MLDs have negotiated a TID-to-link mapping, either MLD may tear down the negotiated TID-to-link mapping by sending an individually addressed TID-to-link mapping teardown frame. After teardown, the MLDs operates in default mapping mode.

When an MLD successfully negotiates a TID-to-link mapping with a peer MLD, both the MLD and the peer MLD update an uplink and/or downlink TID-to-link mapping information according to the negotiated the TID-to-link mapping.

When an MLD has successfully negotiated with a peer MLD an uplink and/or downlink TID-to-link mapping in which the bit position i of a link mapping field n in the TID-to-link mapping element is set to 0, a TID n shall not be mapped to the link associated with the link ID i in uplink and/or downlink. When an MLD has successfully negotiated with a peer MLD an uplink and/or downlink TID-to-link mapping in which the bit position i of a link mapping field n in the TID-to-link mapping element is set to 1, the TID n is mapped to the link associated with the link ID i in uplink and/or downlink.

Figure 10:
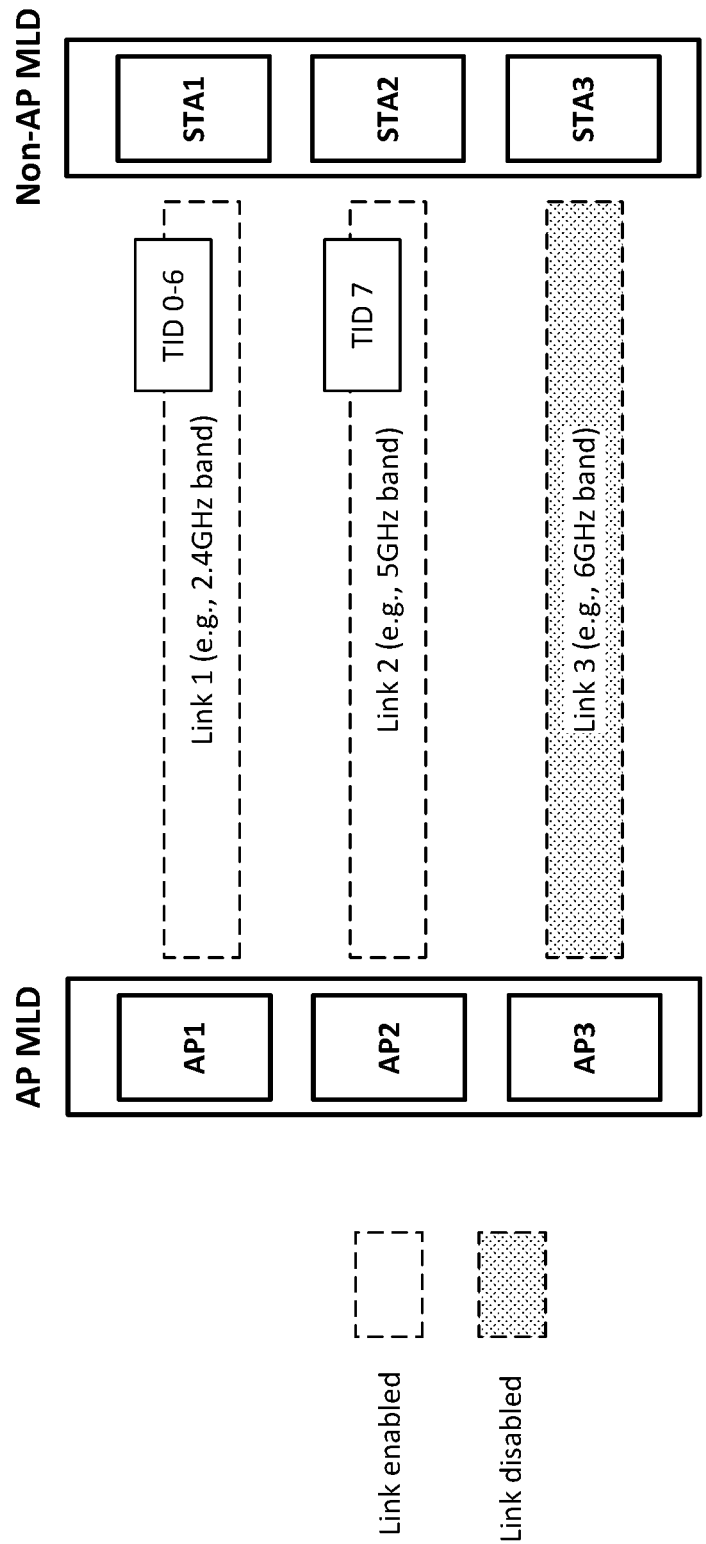
FIG. 10 illustrates an example of a traffic identifier (TID)-to-link mapping in a multi-link communication environment.

FIG. 10 illustrates an example of a TID-to-link mapping in a multi-link communication environment. As shown, the multi-link communication environment includes an AP MLD having three affiliated APs and a non-AP MLD having three affiliated STAs.

During or after multi-link setup, the non-AP MLD and the AP MLD may negotiate a TID-to-link mapping. The TID-to-link mapping maps TIDs at the non-AP MLD in UL and DL to setup links between the AP MLD and the non-AP MLD. For example, as shown in FIG. 10, the TID-to-link mapping may map TIDs 0-6 in both UL and DL to link 1 and TID 7 in both UL and DL to link 2. As such, links 1 and 2 are enabled, and link 3 is disabled. The TID-to-link mapping negotiation may be performed by exchanging an association request/response frame or a TID-to-link mapping request/response frame between the non-AP MLD and the AP MLD.

Figure 11:
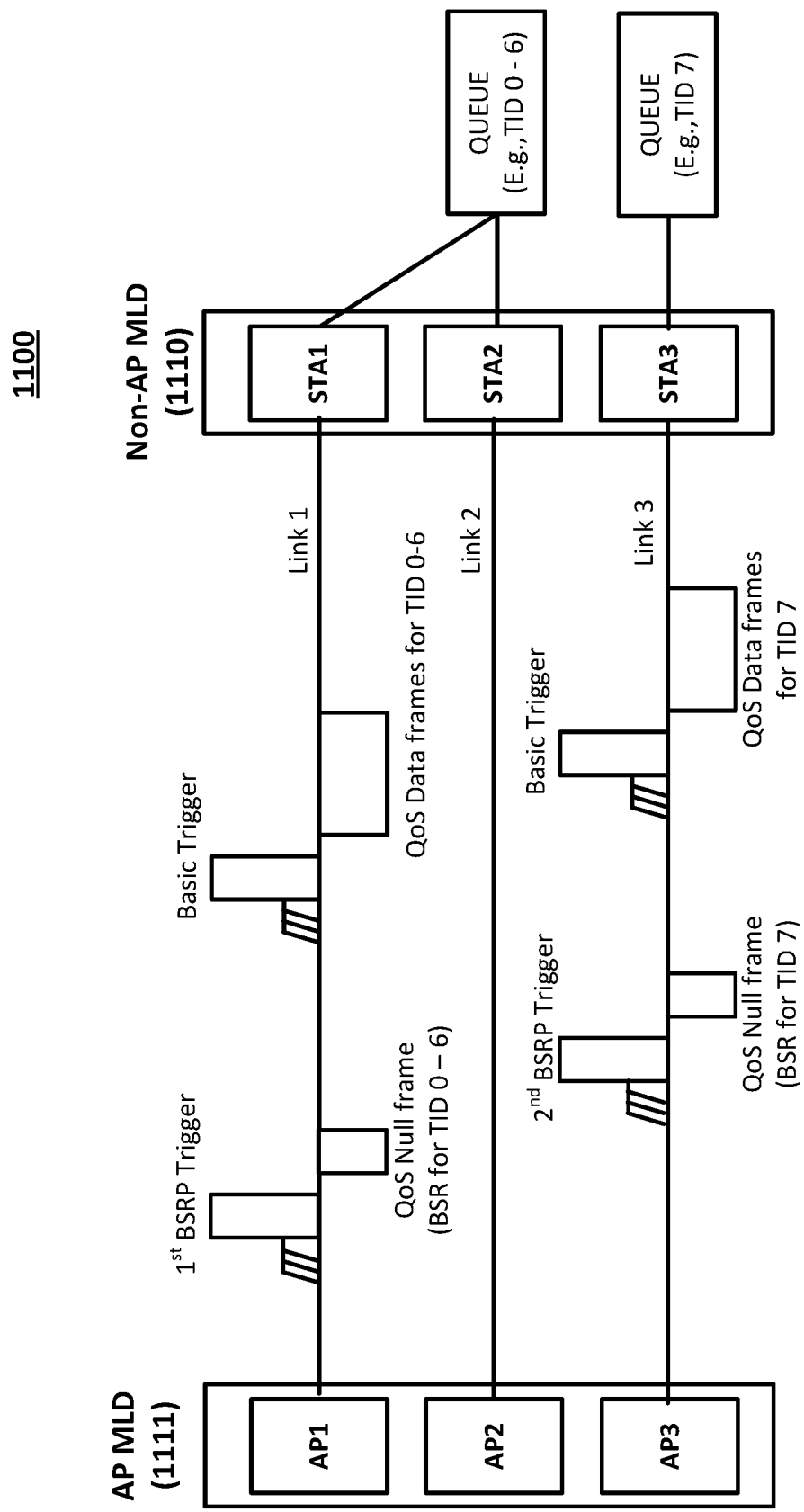
FIG. 11 illustrates existing buffer status reporting in presence of a TID-to-link mapping in an example multi-link communication environment.

FIG. 11 illustrates existing buffer status reporting in presence of a TID-to-link mapping in an example multi-link communication environment 1100. As shown in FIG. 11, example environment 1100 may include a non-AP MLD 1110 and an AP MLD 1111. Non-AP MLD 1110 and AP MLD 1111 may be communicatively coupled by a plurality of (setup) links (e.g., Link 1, Link 2, and Link 3). Non-AP MLD 1110 may include a plurality of affiliated STAs (e.g., STA1, STA2, and STA3). AP MLD 1111 may include a plurality of affiliated APs (e.g., AP1, AP2, and AP3). The plurality of affiliated STAs of non-AP MLD 1110 may each be configured to communicate with a respective one of the plurality of affiliated APs of AP MLD 1111, on a respective one of the plurality of links communicatively coupling non-AP MLD 1110 and AP MLD 1111.

At non-AP MLD 1110, a plurality of UL and/or DL traffic streams may be present. Each traffic may be associated with a TID (e.g., TID 0, TID 1, . . . , TID 7). The various traffic streams may be queued in designated queues at non-AP MLD 1110. A queue may be used to queue the traffic for one or more TIDs.

In an example, non-AP MLD 1110 and AP MLD 1111 may negotiate a TID-to-link mapping. The negotiation of the TID-to-link may include exchanging a TID-to-link mapping element in an association request frame and an association response frame communicated between non-AP MLD 1110 and AP MLD 1111. The TID-to-link mapping maps TIDs at non-AP ML 1110 to links setup between non-AP MLD 1110 and AP MLD 1111 in the uplink and/or the downlink. In an example, as shown in FIG. 11, after a successful TID-to-link mapping negotiation, TID 0 to TID 6 may be mapped to both link 1 and link 2, and TID 7 may be mapped to link 3.

Non-AP MLD 1110 may have buffered traffic associated with TIDs to transmit to AP MLD 1111. As described above with reference to FIG. 6, in solicited buffer status reporting, AP MLD 1111 may solicit non-AP MLD 1110 to report buffer status by transmitting a buffer status report poll trigger frame (BSRP) to AP MLD 1110. Non-AP MLD 1110 may respond by sending a QoS null frame containing one or more buffer status reports (BSRs). In a single link environment, where TIDs at the non-AP STA are all mapped to one and only link, the non-AP STA follows a clear rule in which any BSR, for any TID, is sent on the single link between the non-AP STA and the AP. That, however, is not the case in a multi-link environment, where the non-AP MLD may be communicatively coupled through a plurality of links with the AP MLD, and particularly where the non-AP MLD and the AP MLD have negotiated a TID-to-link mapping assigning each TID at the non-AP MLD to one or more links between the non-AP MLD and the AP MLD.

Indeed, the existing IEEE 802.11 standard specification (e.g., Draft P802.11be_D1.3) is silent regarding which link of a plurality of links a QoS null frame reporting buffer status for a given TID may be transmitted on, when a TID-to-link mapping has been negotiated between the non-AP MLD and the AP MLD. For instance, the existing standard specification provides that "only MSDUs or A-MSDUs with TIDs mapped to an enabled link may be transmitted on that link." While, strictly, a QoS null frame does not contain an MSDU or A-MSDU, following a similar rule for a QoS null frame comprising a TID would have the QoS null frame transmitted only on the mapped link(s) of the TID. The existing standard specification further provides that "Management frames and Control frames may be sent on any enabled link." But a QoS null frame may not be considered a MAC management frame nor a MAC control frame.

Returning to example environment 1100, an operation in accordance with the existing standard specification may have AP MLD 1111 sending a first buffer status report poll (BSRP) trigger frame on link 1 to non-AP MLD 1110. In response to the first BSRP trigger frame, non-AP MLD 1110 may transmit a QoS null frame. In accordance with the negotiated TID-to-link mapping which maps only TIDs 0-6 to link 1, and following a similar rule as existing for MSDUs/A-MSDUs, the non-AP MLD 1110 may include in the transmitted QoS null frame BSRs for only TIDs 0-6, because the BSRP trigger frame was sent on link 1 to which only TIDs 0-6 are mapped. As such, to obtain the buffer status for TID 7, AP MLD 1111 may need to transmit a second BSRP trigger frame on link 3 to solicit the sending by non-AP MLD 1110 of a BSR for TID 7. Overhead and latency may thus be increased for the AP MLD to obtain a complete buffer status (for all TIDs) of the non-AP MLD.

FIGS. 12-15 illustrate example methods of buffer status reporting in presence of a TID-to-link mapping according to embodiments of the present disclosure. For the purpose of illustration only, the example methods are described hereinafter in the context of example multi-link communication environments including a single non-AP MLD and a single AP MLD. As would be understood by a person of skill in the art based on the teachings herein, embodiments are not limited by these examples and may be readily extended to multi-link environments including multiple non-AP MLDs and multiple AP MLDs. Furthermore, the example methods are described with reference to example communications between the non-AP MLD and the AP MLD. These example communications, such as a particular sequence of frame transmissions between the non-AP MLD and the AP MLD, are also provided for illustration only and shall not be used to limit the embodiments of the present disclosure.

Figure 12:
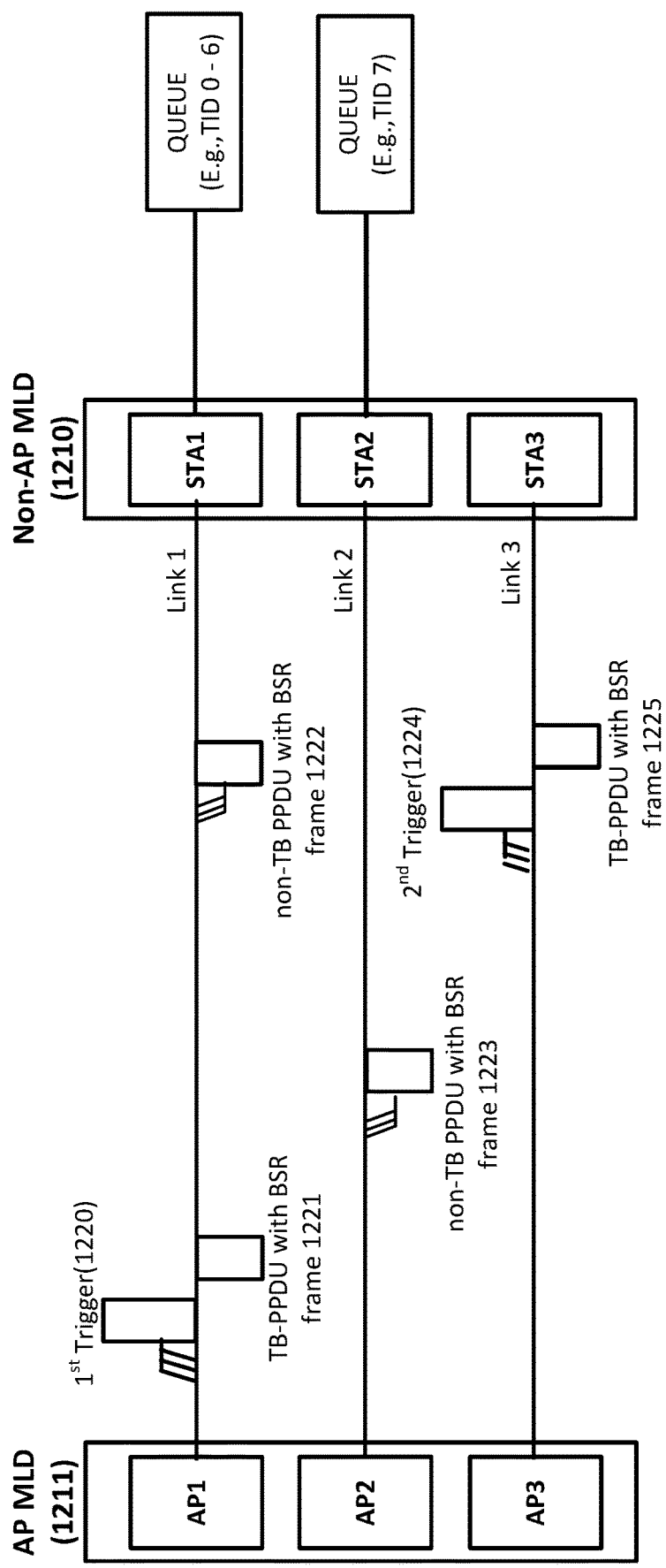
FIGS. 12-15 illustrate example methods of buffer status reporting in presence of a TID-to-link mapping according to embodiments of the present disclosure.

FIG. 12 illustrates, with respect to an example environment 1200, example methods of buffer status reporting according to an embodiment. As shown in FIG. 12, example environment 1200 may include a non-AP MLD 1210 and an AP MLD 1211. Non-AP MLD 1210 and AP MLD 1211 may be communicatively coupled by a plurality of (setup) links (e.g., Link 1, Link 2, and Link 3). Non-AP MLD 1210 may include a plurality of affiliated STAs (e.g., STA1, STA2, and STA3). AP MLD 1211 may include a plurality of affiliated APs (e.g., AP1, AP2, and AP3). The plurality of affiliated STAs of non-AP MLD 1210 may each be configured to communicate with a respective one of the plurality of affiliated APs of AP MLD 1211, on a respective one of the plurality of links communicatively coupling non-AP MLD 1210 and AP MLD 1211.

In an example embodiment, non-AP MLD 1210 and AP MLD 1211 may establish a multi-link set up during an association procedure. The multi-link setup configures a plurality of links, such as Links 1-3, as "setup" links between non-AP MLD 1210 and AP MLD 1211. Each link may communicatively couple an affiliated STA of non-AP MLD 1210 with a respective affiliated AP of AP MLD 1210. In an embodiment, each link may correspond to a particular band of a plurality of supported frequency bands (e.g., 2.4 GHz, 5 GHz, and 6 GHz) between non-AP MLD 1210 and AP MLD 1211.

In an example embodiment, non-AP MLD 1210 and AP MLD 1211 may negotiate a TID-to-link mapping. The negotiation of the TID-to-link may include exchanging a TID-to-link mapping element during the association procedure between non-AP MLD 1110 and AP MLD 1111. In an example, as shown in FIG. 12, TID 0 to TID 6 may be mapped in uplink to link 1 which communicatively couples STA1, affiliated with non-AP MLD 1210, and AP1, affiliated with AP MLD 1211; and TID 7 may be mapped in uplink to link 2 which communicatively couples STA2, affiliated with non-AP MLD 1210, and AP2, affiliated with AP MLD 1211. According to this example TID-to-link mapping, links 1 and 2 may be considered as "enabled" as at least one TID is mapped to each of links 1 and 2. Link 3, on the other hand, may be considered as "disabled" as no TID is mapped to link 3.

Based on the TID-to-link mapping, non-AP MLD 1210 may transmit, on link 1, a frame (not shown in FIG. 12) carrying MSDUs or A-MSDUs with any of TID 0 to TID 6, and may transmit, on link 2, a frame (not shown in FIG. 12) carrying MSDUs or A-MSDUs with TID 7.

Non-AP MLD 1210 may be configured to transmit frames carrying a buffer status report (BSR) to the AP MLD 1211. A BSR frame may be carried by a trigger-based (TB) physical layer protocol data unit (PPDU) or a non-TB PDDU. Various embodiments for transmitting the BSR frame in presence of a negotiated TID-to-link mapping are now described.

In an embodiment, non-AP MLD 1210 may be configured to transmit a BSR frame for any TID, on any enabled link, independent/regardless of the negotiated TID-to-link mapping.

In an example embodiment, non-AP MLD 1210 may be configured to transmit a BSR frame for any TID (e.g., TID 0 to TID 7), on any enabled link, independent/regardless of the negotiated TID-to-link mapping, in response to a trigger frame sent from AP MLD 1211. For example, as illustrated in FIG. 12, non-AP MLD 1210 may have uplink buffered traffic associated with TID 7 when it receives a first trigger frame 1220 on link 1 from AP MLD 1211. The first trigger frame 1220 may be a buffer status report poll (BSRP) trigger frame or a basic trigger frame. Without regard to the TID-to-link mapping which maps TID 7 to only link 2, non-AP MLD 1210 may transmit, on link 1, a BSR frame 1221 that includes buffer status for TID 7, in response to the first trigger frame 1220. BSR frame 1221 may include a QoS null frame indicating TID 7 and the queue size information of TID 7. BSR frame 1221 may be contained in a TB-PPDU.

In another example embodiment, non-AP MLD 1210 may be configured to transmit to AP MLD 1211 an unsolicited BSR frame for any TID, on any enabled link, independent/regardless of the negotiated TID-to-link mapping. The unsolicited BSR is sent without receiving a trigger frame from AP MLD 1211 and may be transmitted after accessing the wireless medium (WM) using enhanced distributed access control (EDCA). For example, as illustrated in FIG. 12, non-AP MLD 1210 may have uplink buffered traffic for TID 7 and for at least one other TID (e.g., any of TID 0 to TID 6) when it obtains a transmission opportunity (TXOP) on link 2. Independent/regardless of the TID-to-link mapping which maps only TID 7 to link 2, non-AP MLD 1210 may transmit a non-TB PPDU carrying a unsolicited BSR frame 1223 for the at least one other TID (other than TID 7). The unsolicited BSR frame 1223 may include one or more QoS null frames indicating buffer status associated with the at least one other TID and the queue size information of the at least one other TID at non-AP MLD 1210. The non-TB PPDU may also carry MSDUs or A-MSDUs for TID 7.

In another example embodiment, non-AP MLD 1210 may be configured to transmit to AP MLD 1211 a BSR frame for any TID, on a disabled link, independent/regardless of the negotiated TID-to-link mapping, in response to a trigger frame sent from AP MLD 1211. For example, as illustrated in FIG. 12, non-AP MLD 1210 may receive a second trigger frame 1224 from AP MLD 1211 indicating one or more resource units (RUs) for uplink OFDMA random access (UORA) on disabled link 3. The second trigger frame 1224 may be a BSRP trigger frame or a basic trigger frame. As any STA is allowed to transmit on the indicated uplink RUs in response to the second trigger frame 1224, non-AP MLD 1210 may transmit a BSR frame 1225 on link 3, even though no TID is mapped to link 3 in the TID-to-link mapping. BSR frame 1225 may include a QoS null frame indicating any TID (e.g., TID 0 to TID 7) and the queue size information of that TID. BSR frame 1225 may be contained in a TB-PPDU.

In another example embodiment, non-AP MLD 1210 may be configured to transmit to AP MLD 1211 an unsolicited BSR frame for a TID, according to the TID-to-link mapping. The unsolicited BSR is sent without receiving a trigger frame from AP MLD 1211 and may be transmitted after accessing the wireless medium (WM) using EDCA. For example, as illustrated in FIG. 12, non-AP MLD 1210 may obtain a transmission opportunity (TXOP) on link 1. In accordance with the TID-to-link mapping, non-AP MLD 1210 may transmit, on link 1, a non-TB PPDU carrying an unsolicited BSR frame 1222 for any of TID 0 to TID 6. The unsolicited BSR frame 1222 may include one or more QoS null frames indicating any of TID 0 to TID 6 and the queue size information for the indicated TID(s). The non-TB PPDU may also carry MSDUs or A-MSDUs for TID 0 to TID 6.

Figure 13:
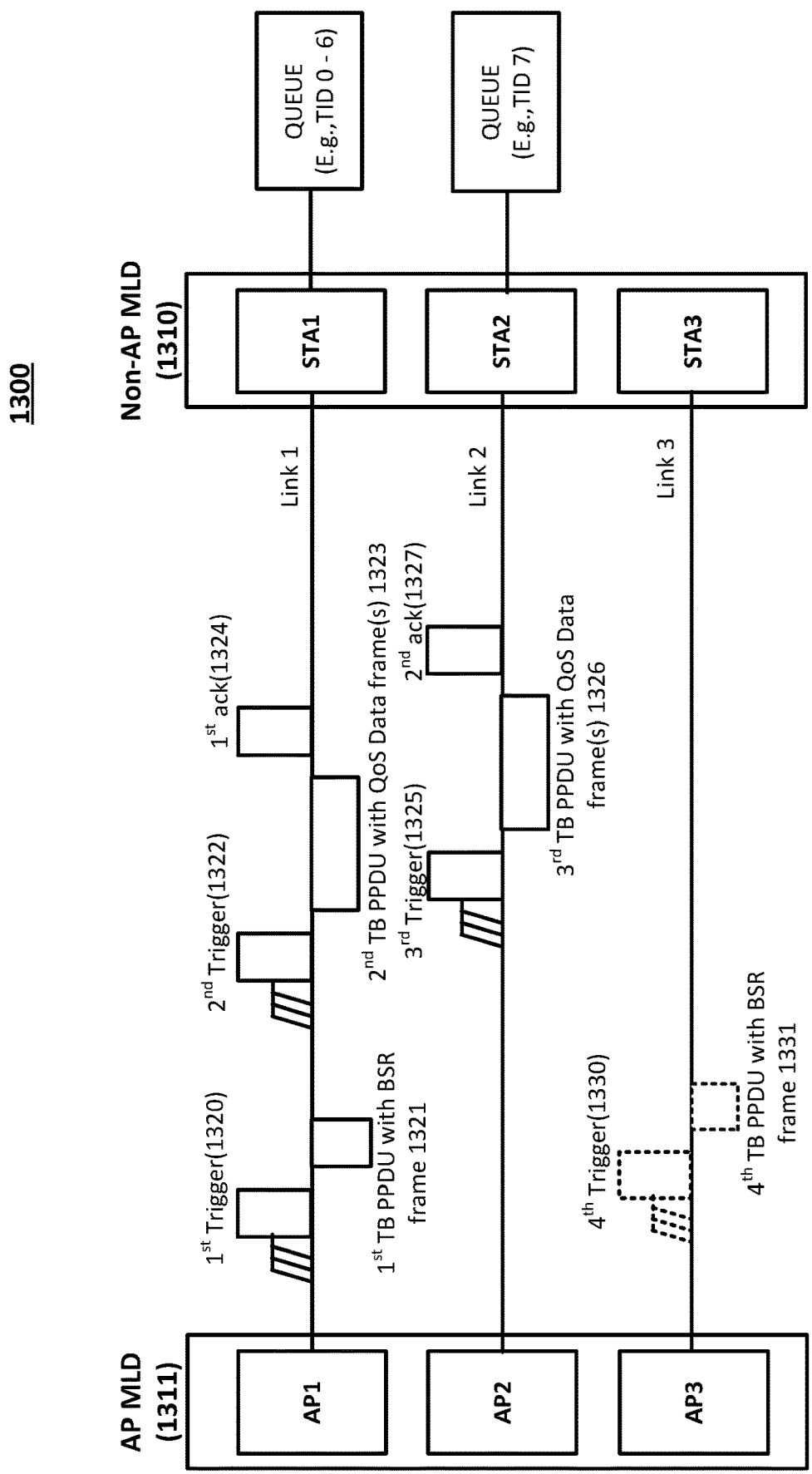

FIG. 13 illustrates, with respect to an example environment 1300, further example methods of buffer status reporting according to an embodiment. As shown in FIG. 13, example environment 1300 may include a non-AP MLD 1310 and an AP MLD 1311. Non-AP MLD 1310 and AP MLD 1311 may be communicatively coupled by a plurality of (setup) links (e.g., Link 1, Link 2, and Link 3). Non-AP MLD 1310 may include a plurality of affiliated STAs (e.g., STA1, STA2, and STA3). AP MLD 1311 may include a plurality of affiliated APs (e.g., AP1, AP2, and AP3). The plurality of affiliated STAs of non-AP MLD 1310 may each be configured to communicate with a respective one of the plurality of affiliated APs of AP MLD 1311, on a respective one of the plurality of links communicatively coupling non-AP MLD 1310 and AP MLD 1311.

As described above with reference to FIG. 12, in an example embodiment, non-AP MLD 1310 and AP MLD 1311 may establish a multi-link set up and negotiate a TID-to-link mapping during an association procedure. In an example, as shown in FIG. 13, TID 0 to TID 6 may be mapped in uplink to link 1 which communicatively couples STA1 and AP1, and TID 7 may be mapped in uplink to link 2 which communicatively couples STA2 and AP2. According to this example TID-to-link mapping, links 1 and 2 may be considered as "enabled" as at least one TID is mapped to each of links 1 and 2. Link 3, on the other hand, may be considered as "disabled" as no TID is mapped to link 3.

Based on the TID-to-link mapping, non-AP MLD 1310 may transmit, on link 1, a frame (not shown in FIG. 13) carrying MSDUs or A-MSDUs with any of TID 0 to TID 6, and may transmit, on link 2, a frame (not shown in FIG. 13) carrying MSDUs or A-MSDUs with TID 7.

In an example, AP MLD 1311 may transmit a first trigger frame 1320 (e.g., a BSRP trigger frame, a basic trigger frame, etc.) to non-AP MLD 1310 on an enabled link (e.g., link 1). Non-AP MLD 1310 receiving the first trigger frame 1320 may respond with a BSR frame 1321 in a first TB PPDU, on the enabled link (e.g., link 1), indicating buffer status for any TID regardless of the TID-to-link mapping. For example, the BSR frame 1321 may include one or more QoS null frames indicating the TID(s) of any of TID 0 to TID 7 and the queue size information for the indicated TIDs.

When AP MLD 1311 receives BSR frame 1321 indicating one or more TID between TID 0 and TID 6, AP MLD 1311 may transmit a second trigger frame 1322 on link 1 (e.g., a basic trigger frame, an MU-RTS TXS trigger frame) to allocate uplink resources to non-AP MLD 1310 for the one or more TID(s) indicated in BSR frame 1321. In response to second trigger frame 1322, non-AP MLD 1310 may transmit on link 1 a second TB-PPDU including one or more QoS data frames 1323 for the one or more indicated TID(s). The QoS data frames 1323 may include MSDUs or A-MSDUs for the one or more indicated TID(s). AP MLD 1311 receiving the second TB PPDU may transmit a first acknowledgement frame 1324 on link 1 in response to the QoS data frames 1323 contained in the second TB PPDU.

When BSR frame 1321 indicates TID 7, AP MLD 1311 may transmit a third trigger frame 1325 on link 2 (e.g., a basic trigger frame, an MU-RTS TXS trigger frame) to allocate uplink resources to non-AP MLD 1310 for transmission for TID 7. In response to third trigger frame 1325, non-AP MLD 1310 may transmit on link 2 a third TB PPDU including one or more QoS data frames 1326 for TID 7. The QoS data frames 1326 may include MSDUs or A-MSDUs for TID 7. AP MLD 1311 receiving the third TB PPDU may transmit a second acknowledgement frame 1327 in response to the QoS data frame(s) 1326 contained in the third TB PPDU.

In another example, AP MLD 1311 may transmit a fourth trigger frame 1330 (e.g., a BSRP trigger frame, a basic trigger frame, etc.) on a disabled link (e.g., link 3) to non-AP MLD 1310. Non-AP MLD 1310 receiving the fourth trigger frame 1330 on the disabled link may respond on the disabled link with a BSR frame 1331 in a fourth TB PPDU indicating buffer status for any TID regardless of the TID-to-link mapping. For example, the BSR frame 1331 may include one or more QoS null frames indicating the TID(s) of any of TID 0 to TID 7 and the queue size information for the indicated TIDs. AP MLD 1311 receiving the fourth TB PPDU may transmit a subsequent trigger frame on link 1 and/or on link 2 to allocate UL resources to non-AP MLD 1310, based on the indicated TIDs and their queue size information indicated in BSR frame 1331.

Figure 14:
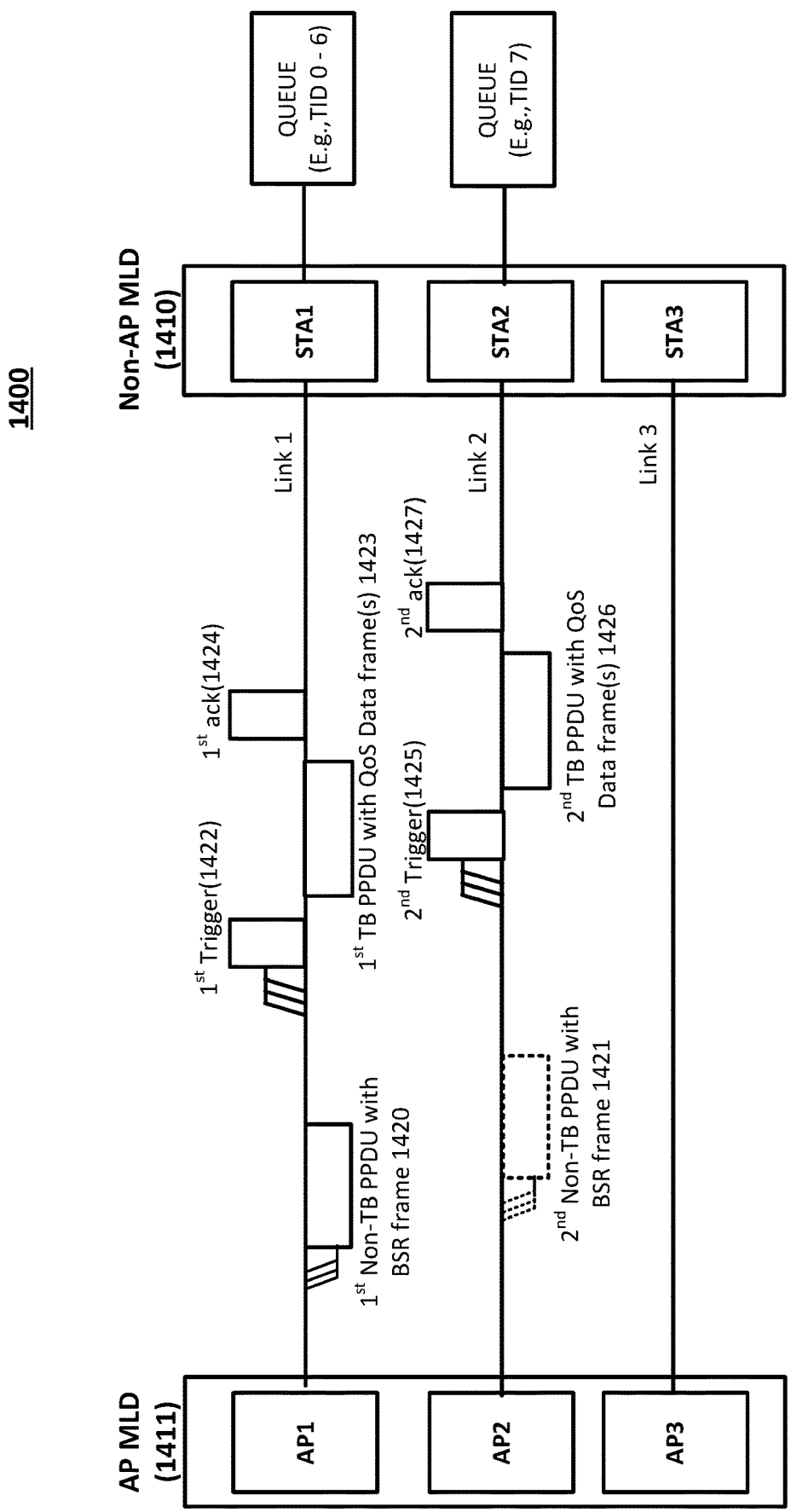

FIG. 14 illustrates, with respect to an example environment 1400, further example methods of buffer status reporting according to an embodiment. As shown in FIG. 14, example environment 1400 may include a non-AP MLD 1410 and an AP MLD 1411. Non-AP MLD 1410 and AP MLD 1411 may be communicatively coupled by a plurality of (setup) links (e.g., Link 1, Link 2, and Link 3). Non-AP MLD 1410 may include a plurality of affiliated STAs (e.g., STA1, STA2, and STA3). AP MLD 1411 may include a plurality of affiliated APs (e.g., AP1, AP2, and AP3). The plurality of affiliated STAs of non-AP MLD 1410 may each be configured to communicate with a respective one of the plurality of affiliated APs of AP MLD 1411, on a respective one of the plurality of links communicatively coupling non-AP MLD 1410 and AP MLD 1411.

As described above with reference to FIG. 12, in an example embodiment, non-AP MLD 1410 and AP MLD 1411 may establish a multi-link set up and negotiate a TID-to-link mapping during an association procedure. In an example, as shown in FIG. 14, TID 0 to TID 6 may be mapped in uplink to link 1 which communicatively couples STA1 and AP1, and TID 7 may be mapped in uplink to link 2 which communicatively couples STA2 and AP2. According to this example TID-to-link mapping, links 1 and 2 may be considered as "enabled" as at least one TID is mapped to each of links 1 and 2. Link 3, on the other hand, may be considered as "disabled" as no TID is mapped to link 3.

Based on the TID-to-link mapping, non-AP MLD 1410 may transmit, on link 1, a frame (not shown in FIG. 14) carrying MSDUs or A-MSDUs with any of TID 0 to TID 6, and may transmit, on link 2, a frame (not shown in FIG. 14) carrying MSDUs or A-MSDUs with TID 7.

In an example, non-AP MLD 1410 may transmit using EDCA a BSR frame 1420 in a first non-TB PPDU indicating buffer status for any TID on an enabled link (e.g., link 1), independent/regardless of the TID-to-link mapping. For example, the BSR frame 1420 may include one or more QoS null frames indicating the TID(s) of any of TID 0 to TID 7 and the queue size information for the indicated TIDs.

When AP MLD 1411 receives BSR frame 1420 indicating one or more TID between TID 0 and TID 6, AP MLD 1411 may transmit a first trigger frame 1422 on link 1 (e.g., a basic trigger frame, an MU-RTS TXS trigger frame) to allocate uplink resources to non-AP MLD 1410 for the one or more TIDs indicated in BSR frame 1420. In response to first trigger frame 1422, non-AP MLD 1410 may transmit on link 1 a first TB PPDU including one or more QoS data frames 1423 for the one or more indicated TIDs. The QoS data frames 1423 may include MSDUs or A-MSDUs for the one or more indicated TID(s). AP MLD 1411 receiving the first TB PPDU may transmit a first acknowledgement frame 1424 in response to the QoS data frames 1423 contained in the first TB PPDU.

When BSR frame 1420 indicates TID 7, AP MLD 1411 may transmit a second trigger frame 1425 (e.g., a basic trigger frame, an MU-RTS TXS trigger frame) on link 2 to allocate uplink resources to non-AP MLD 1410 for transmission of TID 7. In response to second trigger frame 1425, non-AP MLD 1410 may transmit on link 2 a second TB PPDU including one or more QoS data frames 1426. The one or more QoS data frames may include MSDUs or A-MSDUs for TID 7. AP MLD 1411 receiving the second TB PPDU may transmit a second acknowledgement frame 1427 in response to the QoS data frame(s) 1426 contained in the second TB PPDU.

In another example, non-AP MLD 1410 may be configured to transmit a BSR frame indicating buffer status for a TID on an enabled link other than the link to which the indicated TID is mapped. For example, as illustrated in FIG. 14, non-AP MLD 1410 may transmit a BSR frame 1421 in a second non-TB PPDU indicating buffer status for one or more of TIDs 0 to 6 on enabled link 2. The BSR frame 1421 may include one or more QoS null frames indicating one or more of TID 0 to TID 6 and the queue size information for the indicated TID(s). AP MLD 1411 receiving the second non-TB PPDU may transmit a trigger frame (not shown) on link 1 based on the TIDs and their queue size information indicated in BSR frame 1421. In response to the trigger frame, non-AP MLD 1410 may transmit a TB PPDU (not shown) on link 1 including one or more QoS data frames for the indicated TID(s). The one or more QoS frame may include MSDUs or A-MSDUs for the indicated TID(s). AP MLD 1411 receiving the TB PPDU may transmit an acknowledgement frame (not shown) in response to the QoS data frames contained in the TB PPDU.

Figure 15:
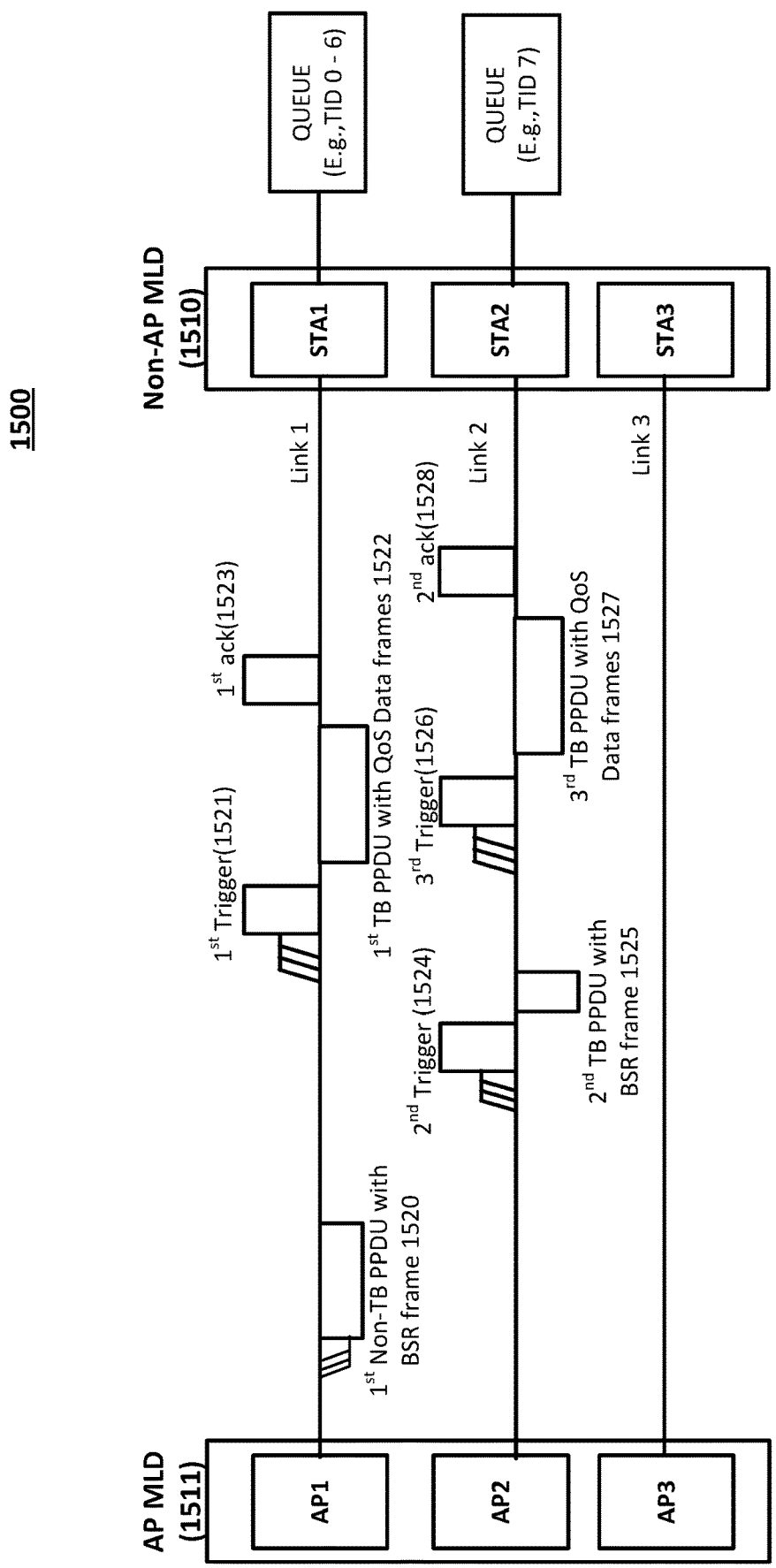

FIG. 15 illustrates, with respect to an example environment 1500, further example methods of buffer status reporting according to an embodiment. As shown in FIG. 15, example environment 1500 may include a non-AP MLD 1510 and an AP MLD 1511. Non-AP MLD 1510 and AP MLD 1511 may be communicatively coupled by a plurality of (setup) links (e.g., Link 1, Link 2, and Link 3). Non-AP MLD 1510 may include a plurality of affiliated STAs (e.g., STA1, STA2, and STA3). AP MLD 1511 may include a plurality of affiliated APs (e.g., AP1, AP2, and AP3). The plurality of affiliated STAs of non-AP MLD 1510 may each be configured to communicate with a respective one of the plurality of affiliated APs of AP MLD 1511, on a respective one of the plurality of links communicatively coupling non-AP MLD 1510 and AP MLD 1511.

As described above with reference to FIG. 12, in an example embodiment, non-AP MLD 1510 and AP MLD 1511 may establish a multi-link set up and negotiate a TID-to-link mapping during an association procedure. In an example, as shown in FIG. 15, TID 0 to TID 6 may be mapped in uplink to link 1 which communicatively couples STA1 and AP1, and TID 7 may be mapped in uplink to link 2 which communicatively couples STA2 and AP2. According to this example TID-to-link mapping, links 1 and 2 may be considered as "enabled" as at least one TID is mapped to each of links 1 and 2. Link 3, on the other hand, may be considered as "disabled" as no TID is mapped to link 3.

Based on the TmD-to-link mapping, non-AP MLD 1510 may transmit, on link 1, a frame (not shown in FIG. 15) carrying MSDUs or A-MSDUs with any of TID 0 to TID 6, and may transmit, on link 2, a frame (not shown in FIG. 15) carrying MSDUs or A-MSDUs with TID 7.

In an example, non-AP MLD 1510 may be configured to transmit, on an enabled link, using EDCA an unsolicited BSR frame indicating buffer status for TID(s) according to the TID-to-link mapping. For example, as illustrated in FIG. 15, non-AP MLD 510 may transmit on link 1 a first non-TB PPDU including an unsolicited BSR 1520 indicating buffer status for any TID mapped to link 1 (i.e., TID 0 to TID 6). BSR frame 1520 may include one or more QoS null frames indicating the TID(s) of any of TID 0 to TID 6 and the queue size information for the indicated TID(s).

When AP MLD 1511 receives BSR frame 1520, the AP MLD 1511 may transmit a first trigger frame 1521 (e.g., a basic trigger frame, an MU-RTS TXS trigger frame) on link 1 to allocate uplink resources to non-AP MLD 1510 for the one or more TIDs indicated in BSR frame 1520. In response to first trigger frame 1521, non-AP MLD 1510 may transmit on link 1 a first TB PPDU including one or more QoS data frames 1522 for the one or more indicated TIDs. The QoS data frames may include MSDUs or A-MSDUs for the one or more indicated TID(s). AP MLD 1511 receiving the first TB PPDU may transmit a first acknowledgement frame 1523 in response to the QoS data frames 1522 contained in the first TB PPDU.

In another example, AP MLD 1411 may transmit a second trigger frame 1524 (e.g., a BSRP trigger frame) on link 2 to solicit non-AP MLD 1510 for buffer status at non-AP MLD 1510. In response to second trigger frame 1524, non-AP MLD 1510 may transmit on link 2 a second TB PPDU including a BSR frame 1525 indicating, according to the TID-to-link mapping, buffer status for TID 7 (e.g., a QoS null frame indicating TID 7 and the queue size information for TID 7). AP MLD 1511 receiving BSR frame 1525 may transmit a third trigger frame 1526 (e.g., a basic trigger frame, an MU-RTS TXS trigger frame) on link 2 to allocate uplink resources to non-AP MLD 1510 for TID 7. In response to third trigger frame 1526, non-AP MLD 1510 may transmit on link 2 a third TB PPDU including one or more QoS data frames 1527 for the TID 7. The one or more QoS data frames 1527 may include MSDUs or A-MSDUs for TID 7. AP MLD 1511 receiving the third TB PPDU may transmit a second acknowledgement frame 1528 in response to the QoS data frames 1527 contained in the third TB PPDU.

Figure 16:
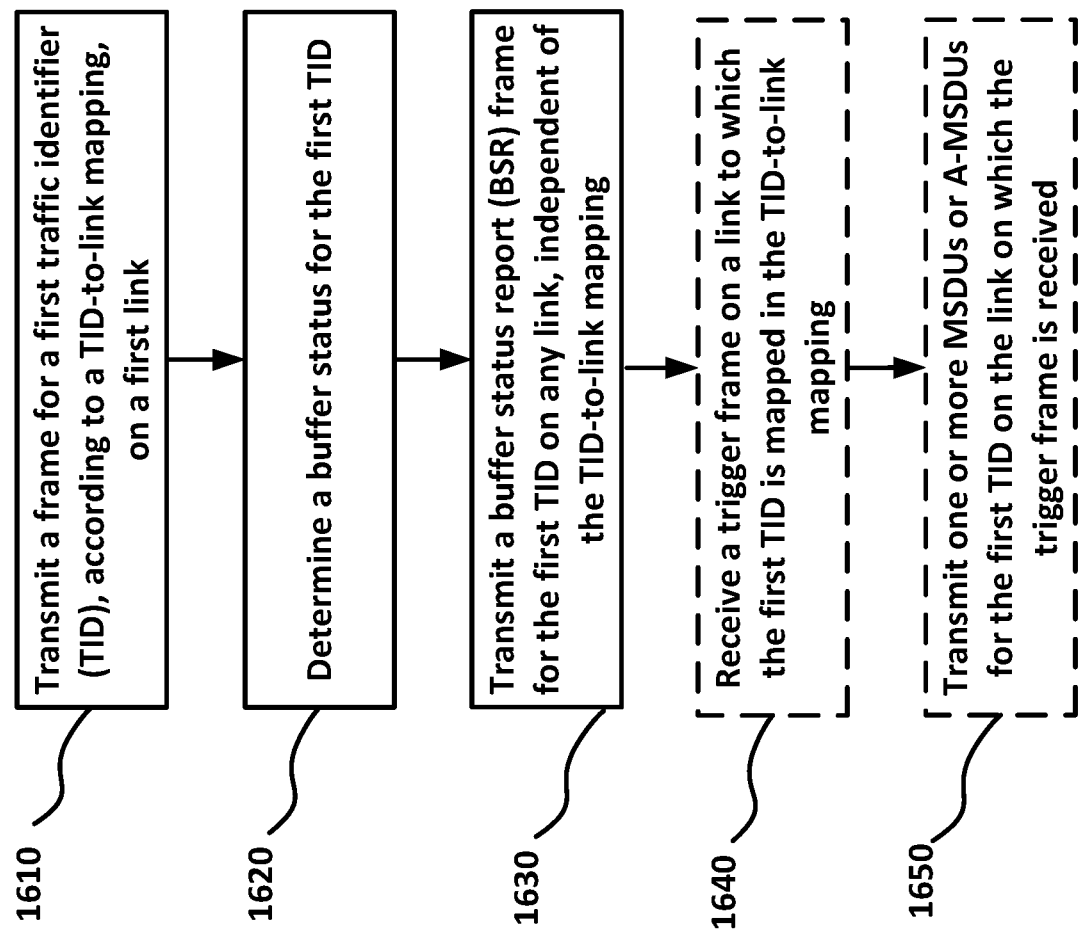
FIG. 16 illustrates an example process for transmitting buffer status according to an embodiment of the present disclosure.

FIG. 16 illustrates an example process 1600 for transmitting buffer status according to an embodiment of the present disclosure. Example process 1600 may be performed in an example environment that includes an AP MLD and a non-AP MLD. The non-AP MLD and the AP MLD may be communicatively coupled by a plurality of links, and may be associated with a TID-to-link mapping. The TID-to-link mapping may include a first mapping of a first TID in uplink to a first set of links of the plurality of links and a second mapping of a second TID in uplink to a second set of links of the plurality of links. In an embodiment, the TID-to-link mapping is based on: a TID-to-link mapping element exchanged in an association request frame and an association response frame between the non-AP MLD and the AP MLD; or a default mapping mode in which a TID is mapped to all of the plurality of links for both downlink and uplink.

Example process 1600 may be performed by the non-AP MLD.

As shown in FIG. 16, process 1600 may include, in step 1610, transmitting a frame for the first TID, according to the TID-to-link mapping, on a first link of the first set of links.

In an embodiment, the frame for the first TID includes a frame carrying one or more MSDUs or A-MSDUs for the first TID.

In step 1620, process 1600 may include determining a buffer status for the first TID.

In step 1630, process 1600 may include transmitting a BSR frame indicating the buffer status for the first TID on any link of the plurality of links, independent/regardless of the TID-to-link mapping.

In an embodiment, the link on which the BSR frame is transmitted is an enabled link, that is, a link having at least one TID mapped to it according to the TID-to-link mapping.

In an embodiment, the link on which the BSR frame is transmitted belongs to the first set of links of the plurality of links.

In an embodiment, the link on which the BSR frame is transmitted belongs to the second set of links of the plurality of links.

In an embodiment, the link on which the BSR frame is transmitted is a link to which the first TID is not mapped in the TID-to-link mapping.

In an embodiment, the link on which the BSR frame is transmitted is a disabled link, that is, a link having no TIDs mapped to it according to the TID-to-link mapping.

In an embodiment, the BSR frame includes a QoS null frame indicating the first TID and the queue size information for the first TID.

In an embodiment, the BSR frame includes a QoS null frame including a QoS control field; or a QoS null frame including a QoS control field and a BSR control subfield.

In an embodiment, the QoS control field comprises at least one of: a TID subfield, where the TID subfield identifies a traffic class (TC) or a traffic stream (TS) for which a transmission opportunity (TXOP) is being requested; and a queue size subfield, wherein the queue size subfield indicates a total size in octets of MSDUs or A-MSDUs having a TID equal to a value of the TID subfield and which are buffered at the non-AP MLD.

In an embodiment, the BSR control subfield comprises at least one of: an access category index (ACI) bitmap subfield; a delta TID subfield; an ACI high subfield; a scaling factor subfield; a queue size high subfield; and a queue size all subfield. The ACI bitmap subfield indicates at least one access category (AC) for which buffer status is reported in the BSR frame. The delta TID subfield indicates the number of TIDs for which buffer status is reported in the BSR frame. The ACI high subfield indicates the ACI of the at least one AC for which buffer status is indicated in the queue size high subfield. The scaling factor indicates the size in octets of a unit, SF, of the queue size high and queue size all subfields. The queue size high subfield indicates the amount of buffered traffic, in units of SF, for the AC identified by the ACI high subfield. The queue size all subfield indicates the amount of buffered traffic, in units of SF, for the at least one AC identified by the ACI bitmap subfield.

In an embodiment, transmitting the BSR frame in step 1630 includes transmitting the BSR frame in a TB PPDU or a non-TB PPDU.

In an embodiment, transmitting the BSR frame in step 1630 is responsive to a trigger frame received from the AP MLD. The trigger frame may include a BSRP trigger frame or a basic trigger frame. The BSR frame may be transmitted in a TB PPDU.

In an embodiment, transmitting the BSR frame in step 1630 includes performing an ECDA-based transmission. The EDCA-based transmission may include transmitting a non-TB PPDU.

In an embodiment, process 1600 may optionally include steps 1640 and 1650.

In step 1640, process 1600 may include the non-AP MLD receiving a trigger frame from the AP MLD in response to the BSR frame. The trigger frame may be received on a link to which the first TID is mapped in the TID-to-link mapping. The trigger frame may be a basic trigger frame or an MU-RTS TXS trigger frame.

In step 1650, the non-AP MLD receiving the trigger frame in step 1640 may transmit a frame carrying MSDUs or A-MSDUs for the first TID on the link on which the trigger frame is received.

Figure 17:
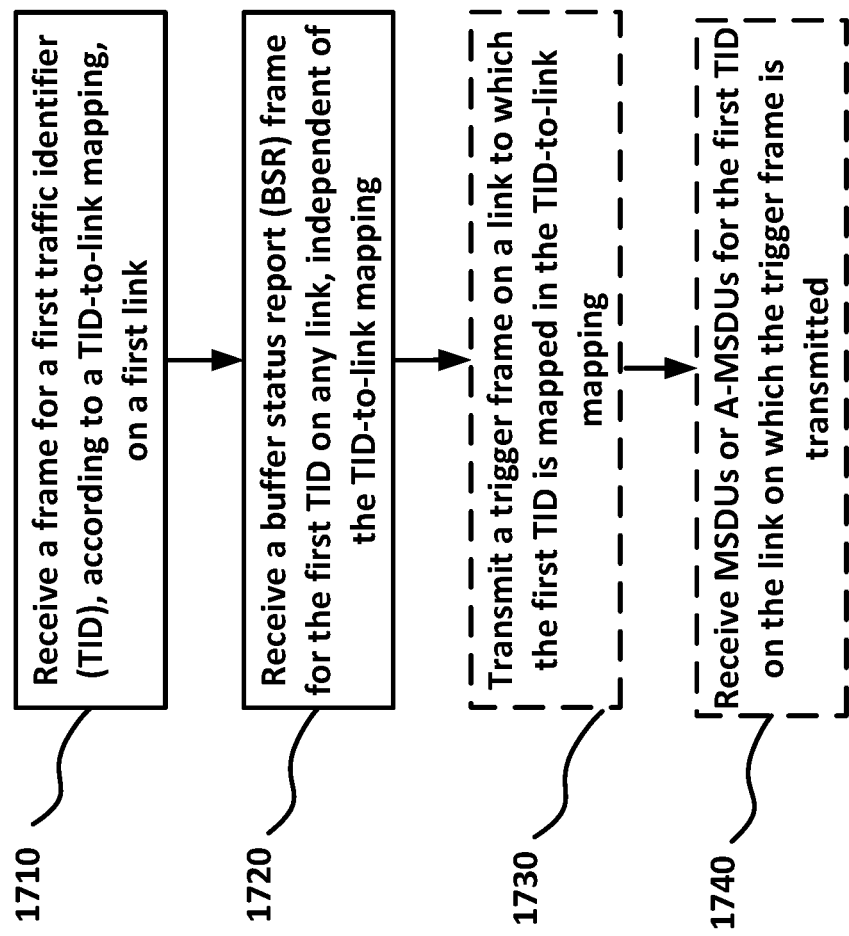
FIG. 17 illustrates an example process for receiving buffer status according to an embodiment of the present disclosure.

FIG. 17 illustrates an example process 1700 for receiving buffer status according to an embodiment of the present disclosure. Example process 1700 may be performed in an example environment that includes an AP MLD and a non-AP MLD. The non-AP MLD and the AP MLD may be communicatively coupled by a plurality of links, and may be associated with a TID-to-link mapping. The TID-to-link mapping may include a first mapping of a first TID in uplink to a first set of links of the plurality of links and a second mapping of a second TID in uplink to a second set of links of the plurality of links. In an embodiment, the TID-to-link mapping is based on: a TID-to-link mapping element exchanged in an association request frame and an association response frame between the non-AP MLD and the AP MLD; or a default mapping mode in which a TID is mapped to all of the plurality of links for both downlink and uplink.

Example process 1700 may be performed by the AP MLD.

As shown in FIG. 17, process 1700 may include, in step 1710, receiving from a non-AP MLD a frame for a first TID, according to the TID-to-link mapping, on a first link of the first set of links. The first frame may carry MAC service data units (MSDUs) or aggregated MSDUs (A-MSDUs) for the first TID.

In step 1720, process 1700 may include receiving a buffer status report (BSR) frame for the first TID on any link of the plurality of links, independent/regardless of the TID-to-link mapping.

In an embodiment, the link on which the BSR frame is received is an enabled link, that is, a link having at least one TID mapped to it according to the TID-to-link mapping.

In an embodiment, the link on which the BSR frame is received belongs to the first set of links of the plurality of links.

In an embodiment, the link on which the BSR frame is received belongs to the second set of links of the plurality of links.

In an embodiment, the link on which the BSR frame is received is a link to which the first TID is not mapped in the TID-to-link mapping.

In an embodiment, the link on which the BSR frame is received is a disabled link, that is, a link having no TIDs mapped to it according to the TID-to-link mapping.

In an embodiment, the BSR frame includes a QoS null frame indicating the first TID and the queue size information for the first TID.

In an embodiment, the BSR frame includes a QoS null frame including a QoS control field; or a QoS null frame including a QoS control field and a BSR control subfield.

In an embodiment, the QoS control field comprises at least one of: a TID subfield, where the TID subfield identifies a traffic class (TC) or a traffic stream (TS) for which a transmission opportunity (TXOP) is being requested; and a queue size subfield, wherein the queue size subfield indicates a total size in octets of MSDUs or A-MSDUs having a TID equal to a value of the TID subfield and which are buffered at the non-AP MLD.

In an embodiment, the BSR control subfield comprises at least one of: an access category index (ACI) bitmap subfield; a delta TID subfield; an ACI high subfield; a scaling factor subfield; a queue size high subfield; and a queue size all subfield. The ACI bitmap subfield indicates at least one access category (AC) for which buffer status is reported in the BSR frame. The delta TID subfield indicates the number of TIDs for which buffer status is reported in the BSR frame. The ACI high subfield indicates the ACI of the at least one AC for which buffer status is indicated in the queue size high subfield. The scaling factor indicates the size in octets of a unit, SF, of the queue size high and queue size all subfields. The queue size high subfield indicates the amount of buffered traffic, in units of SF, for the AC identified by the ACI high subfield. The queue size all subfield indicates the amount of buffered traffic, in units of SF, for the at least one AC identified by the ACI bitmap subfield.

In an embodiment, receiving the BSR frame in step 1720 includes receiving the BSR frame in a TB PPDU or a non-TB PPDU.

In an embodiment, receiving the BSR frame is in response to a trigger frame sent by the AP MLD. The trigger frame may include a BSRP trigger frame or a basic trigger frame.

In an embodiment, process 1700 may optionally include steps 1730 and 1740.

In step 1730, process 1700 may include transmitting a trigger frame in response to the BSR on a link to which the first TID is mapped in the TID-to-link mapping. The link may be any link of the first set of links. The trigger frame allocates uplink resources to the AP MLD for the first TID. The trigger frame may include a basic trigger frame or a MU-RTS TXS trigger frame.

In step 1740, process 1700 may include receiving one or more MSDUs or A-MSDUs for the first TID on the link on which the trigger frame is transmitted.

In an example embodiment, a non-AP MLD may transmit to an AP MLD a frame based on a TID-to-link mapping, where the TID-to-link mapping indicates a mapping of a first TID to a first set of links and a mapping of a second TID to a second set of links. The non-AP MLD may transmit to the AP MLD a buffer status report (BSR) frame indicating a buffer status for the first TID on any link regardless of the TID-to-link mapping.

In example embodiments, a non-AP MLD and an AP MLD may set up a plurality of links for multi-link operation and may negotiate a TID-to-link mapping during an association procedure between the non-AP MLD and the AP MLD, where the TID-to-link mapping may include a first mapping of a first TID in uplink to a first set of links of the plurality of links and a second mapping of a second TID in uplink to a second set of links of the plurality of links. The non-AP MLD may transmit to the AP MLD a frame carrying MSDUs or A-MSDUs for the first TID on a first link of the first set of links. The non-AP MLD may determine a buffer status for the first TID. The non-AP MLD may transmit a BSR frame indicating the buffer status for the first TID (e.g., a QoS null frame indicating the first TID and including the queue size information for the first TID) on any link of the plurality of links, regardless of the TID-to-link mapping.

In an example embodiment, transmission of the BSR frame on any link of the plurality of links, regardless of the negotiated TID-to-link mapping, may reduce the latency for an AP MLD to obtain the buffer status of an non-AP MLD. Additionally, signaling overhead may be reduced by the AP MLD not transmitting a trigger frame to poll buffer status report on each enabled link. The AP MLD may obtain accurate buffer status of the non-AP MLD on time by receiving a PPDU including a buffer status report frame.

In example embodiments, the BSR frame may be transmitted based on a different rule depending on which PPDU carries the BSR frame when the TID-to-link mapping has been negotiated. In an example embodiment, a trigger-based (TB) PPDU including a BSR frame (e.g., a QoS null frame) indicating the buffer status for a TID may be transmitted on any link of the plurality of links regardless of the TID-to-link mapping, where the TB PPDU is transmitted by a non-AP MLD in response to a trigger frame (e.g., a buffer status report poll (BSRP) trigger frame, a basic trigger frame, etc.) sent by an AP MLD. In another example embodiment, a non-TB PPDU including a BSR frame (e.g., a QoS null frame) indicating the buffer status for a TID may be transmitted on a link to which the TID is mapped according to the TID-to-link mapping.

In an example embodiment, transmission of the BSR frame in the non-TB PPDU may follow the TID-to-link mapping rule and the non-AP MLD may have the same implementation for transmission of a frame with TID(s) using EDCA channel access when the TID-to-link mapping has been negotiated. In an example embodiment, transmission of the BSR frame in the TB PPDU for any TID on any link of the plurality of links, regardless of the TID-to-link mapping, may provide the AP MLD with low latency and more accurate BSR by the AP MLD transmitting a trigger frame to the non-AP MLD when the AP MLD needs to obtain the BSR information from the non-AP MLD.

Figure 18:
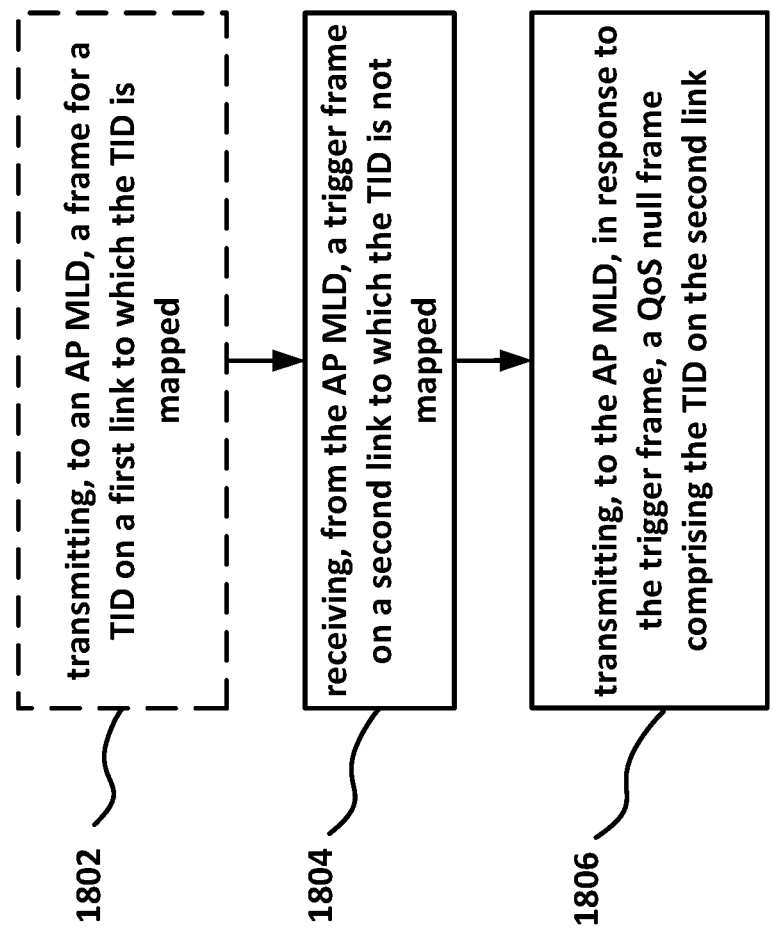
FIG. 18 illustrates an example process according to an embodiment.

FIG. 18 illustrates an example process 1800 according to an embodiment. Example process 1800 may be performed in an example environment that includes an AP MLD and a non-AP MLD. The non-AP MLD and the AP MLD may be communicatively coupled by a plurality of links and may be associated with a TID-to-link mapping. The TID-to-link mapping may include a mapping of a TID in uplink and/or downlink to a first set of links of the plurality of links. Example process 1800 may be performed by the non-AP MLD.

As shown in FIG. 18, process 1800 may begin in optional step 1802, which includes transmitting, to the AP MLD, a frame for the TID on a first link, of the first set of links, to which the TID is mapped in the TID-to-link mapping. In an embodiment, the frame for the TID comprises an MSDU or an A-MSDU for the TID.

In step 1804, process 1800 includes receiving, from the AP MLD, a trigger frame on a second link to which the TID is not mapped in the TID-to-link mapping. In an embodiment, the trigger frame comprises a BSRP trigger frame or a basic trigger frame.

In step 1806, process 1800 includes transmitting, to the AP MLD, in response to the trigger frame, a QoS null frame comprising the TID on the second link. In an embodiment, the second link is an enabled link to which at least one TID is mapped according to the TID-to-link mapping. In another embodiment, the second link is a disabled link to which no TID is mapped according to the TID-to-link mapping. In an embodiment, the QoS null frame comprises a BSR for the TID. In another embodiment, the QoS null frame further comprises a BSR for another TID mapped to the second link.

In an embodiment, the QoS null frame comprises a QoS control field that comprises the BSR for the TID. In an embodiment, the QoS control field comprises at least one of: a TID subfield identifying a traffic class (TC) or a traffic stream (TS) for which a transmission opportunity (TXOP) is being requested; and a queue size subfield indicating a total size in octets of MSDUs and A-MSDUs having a TID equal to a value of the TID subfield and that are buffered at the non-AP MLD. In another embodiment, the QoS null frame comprises a BSR control subfield that comprises the BSR for the TID.

In an embodiment, process 1800 may further comprise, before step 1802, receiving, from the AP MLD, an association frame comprising the TID-to-link mapping that maps the TID to the first set of links.

In an embodiment, process 1800 may further comprise: receiving, from the AP MLD, in response to the QoS null frame, a trigger frame on the first link, the trigger frame allocating uplink resources on the first link to the non-AP MLD for the TID; and transmitting, to the AP MLD, in response to the trigger frame, a frame comprising a QoS data frame for the TID.

Figure 19:
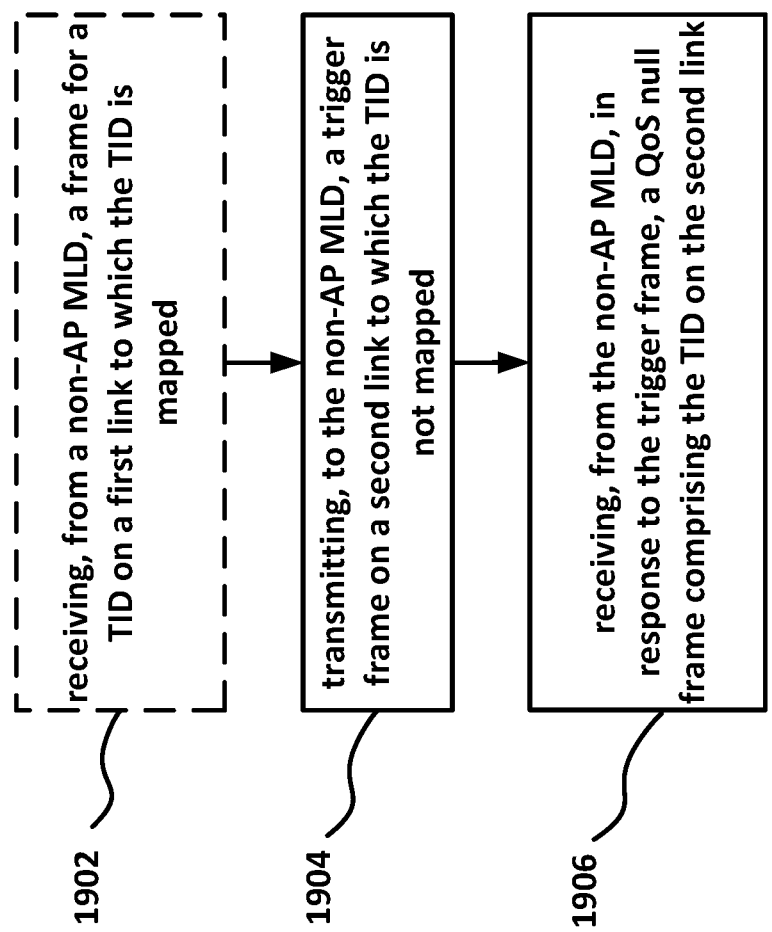
FIG. 19 illustrates an example process according to an embodiment.

FIG. 19 illustrates an example process 1900 according to an embodiment. Example process 1900 may be performed in an example environment that includes an AP MLD and a non-AP MLD. The non-AP MLD and the AP MLD may be communicatively coupled by a plurality of links and may be associated with a TID-to-link mapping. The TID-to-link mapping may include a mapping of a TID in uplink and/or downlink to a first set of links of the plurality of links. Example process 1900 may be performed by the AP MLD.

As shown in FIG. 19, process 1900 may begin in optional step 1902, which includes receiving, from the non-AP MLD, a frame for the TID on a first link, of the set of links, to which the TID is mapped in a TID-to-link mapping. In an embodiment, the frame for the TID comprises an MSDU or an A-MSDU for the TID.

In step 1904, process 1900 includes transmitting, to the non-AP MLD, a trigger frame on a second link to which the TID is not mapped in the TID-to-link mapping. In an embodiment, the trigger frame comprises a BSRP trigger frame or a basic trigger frame.

In step 1906, process 1900 includes receiving, from the non-AP MLD, in response to the trigger frame, a QoS null frame comprising the TID on the second link. In an embodiment, the second link is an enabled link to which at least one TID is mapped according to the TID-to-link mapping. In another embodiment, the second link is a disabled link to which no TID is mapped according to the TID-to-link mapping. In an embodiment, the QoS null frame comprises a BSR for the TID. In another embodiment, the QoS null frame further comprises a BSR for another TID mapped to the second link.

In an embodiment, the QoS null frame comprises a QoS control field that comprises the BSR for the TID. In an embodiment, the QoS control field comprises at least one of: a TID subfield identifying a TC or a TS for which a TXOP is being requested; and a queue size subfield indicating a total size in octets of MSDUs and A-MSDUs having a TID equal to a value of the TID subfield and that are buffered at the non-AP MLD. In another embodiment, the QoS null frame comprises a BSR control subfield that comprises the BSR for the TID.

In an embodiment, process 1900 may further comprise, before step 1902, transmitting, to the non-AP MLD, an association frame comprising the TID-to-link mapping that maps the TID to the first set of links.

In an embodiment, process 1900 may further comprise: transmitting, to the non-AP MLD, in response to the QoS null frame, a trigger frame on the first link, the trigger frame allocating uplink resources on the first link to the non-AP MLD for the TID; and receiving, from the non-AP MLD, in response to the trigger frame, a frame comprising a QoS data frame for the TID.

In an example embodiment, a non-AP MLD may receive from an AP MLD a trigger frame on a first link of a plurality of links between the non-AP MLD and the AP MLD. The non-AP MLD may transmit to the AP MLD, in response to the trigger frame, a QoS null frame comprising TID, on a second link of the plurality of links, regardless of whether the TID is mapped to the second link in a TID-to-link mapping. In an embodiment, the TID is not mapped to the second link in the TID-to-link mapping. The TID may or may not be mapped to the first link in the TID-to-link mapping. In another embodiment, the TID is mapped to the second link in the TID-to-link mapping. The TID may or may not be mapped to the first link in the TID-to-link mapping.

In another example embodiment, an AP MLD may transmit to a non-AP MLD a trigger frame on a first link of a plurality of links between the AP MLD and the non-AP MLD. The AP MLD may receive from the non-AP MLD, in response to the trigger frame, a QoS null frame comprising a TID, on a second link of the plurality of links, regardless of whether the TID is mapped to the second link in a TID-to-link mapping. In an embodiment, the TID is not mapped to the second link in the TID-to-link mapping. The TID may or may not be mapped to the first link in the TID-to-link mapping. In another embodiment, the TID is mapped to the second link in the TID-to-link mapping. The TID may or may not be mapped to the first link in the TID-to-link mapping.

The invention claimed is:

1. A non-access point (non-AP) multi-link device (MLD) comprising:
   one or more processors; and
   a memory storing instructions that, when executed by the one or more processors, cause the non-AP MLD to:
   receive, from an access point (AP) MLD, an association frame comprising a traffic identifier (TID)-to-link (TID-to-link) mapping that maps a TID to a first link;
   transmit, to the AP MLD, a first frame for the TID on the first link;
   receive, from the AP MLD, a first trigger frame on a second link to which the TID is not mapped, wherein the first trigger frame comprises a buffer status report poll (BSRP) trigger frame or a basic trigger frame; and
   transmit, to the AP MLD, in response to the first trigger frame, a Quality of Service (QoS) null frame comprising the TID on the second link, wherein the QoS null frame comprises a first buffer status report (BSR) for the TID.

2. The non-AP MLD of claim 1, wherein the second link is an enabled link to which at least one TID is mapped according to the TID-to-link mapping.

3. The non-AP MLD of claim 1, wherein the first frame for the TID comprises a Medium Access Control (MAC) Service Data Unit (MSDU) or an Aggregated MSDU (A-MSDU) for the TID.

4. The non-AP MLD of claim 1, wherein the QoS null frame comprises a second BSR for another TID mapped to the second link.

5. The non-AP MLD of claim 1, wherein the QoS null frame comprises a QoS control field or a BSR control subfield that comprises the first BSR for the TID.

6. The non-AP MLD of claim 5, wherein the QoS null frame comprises the QoS control field, and wherein the QoS control field comprises a TID subfield identifying a traffic class (TC) or a traffic stream (TS) for which a transmission opportunity (TXOP) is requested by the non-AP MLD.

7. The non-AP MLD of claim 1, wherein the instructions, when executed by the one or more processors, further cause the non-AP MLD to:
   receive, from the AP MLD, in response to the QoS null frame, a second trigger frame on the first link, the second trigger frame allocating uplink resources on the first link to the non-AP MLD for the TID; and
   transmit, to the AP MLD, in response to the second trigger frame, a second frame comprising a QoS data frame for the TID.

8. An access point (AP) multi-link device (MLD) comprising:
   one or more processors; and
   a memory storing instructions that, when executed by the one or more processors, cause the AP MLD to:
   transmit, to a non-access point (non-AP) MLD, an association frame comprising a traffic identifier (TID)-to-link (TID-to-link) mapping that maps a TID to a first link;
   receive, from the non-AP MLD, a first frame for the TID on the first link;
   transmit, to the non-AP MLD, a first trigger frame on a second link to which the TID is not mapped, wherein the first trigger frame comprises a buffer status report poll (BSRP) trigger frame or a basic trigger frame; and
   receive, from the non-AP MLD, in response to the first trigger frame, a Quality of Service (QoS) null frame comprising the TID on the second link, wherein the QoS null frame comprises a first buffer status report (BSR) for the TID.

9. The AP MLD of claim 8, wherein the second link is an enabled link to which at least one TID is mapped according to the TID-to-link mapping.

10. The AP MLD of claim 8, wherein the first frame for the TID comprises a Medium Access Control (MAC) Service Data Unit (MSDU) or an Aggregated MSDU (A-MSDU) for the TID.

11. The AP MLD of claim 8, wherein the QoS null frame comprises a second BSR for another TID mapped to the second link.

12. The AP MLD of claim 8, wherein the QoS null frame comprises a QoS control field or a BSR control subfield that comprises the first BSR for the TID.

13. The AP MLD of claim 12, wherein the QoS null frame comprises the QoS control field, and wherein the QoS control field comprises a TID subfield identifying a traffic class (TC) or a traffic stream (TS) for which a transmission opportunity (TXOP) is requested by the non-AP MLD.

14. The AP MLD of claim 8, wherein the instructions, when executed by the one or more processors, further cause the AP MLD to:
   transmit, to the non-AP MLD, in response to the QoS null frame, a second trigger frame on the first link, the second trigger frame allocating uplink resources on the first link to the non-AP MLD for the TID; and
   receive, from the non-AP MLD, in response to the second trigger frame, a second frame comprising a QoS data frame for the TID.

15. A non-transitory computer-readable medium comprising instructions that, when executed by one or more processors of a non-access point (non-AP) multi-link device (MLD), cause the non-AP MLD to:
   receive, from an access point (AP) MLD, an association frame comprising a traffic identifier (TID)-to-link (TID-to-link) mapping that maps a TID to a first link;
   transmit, to the AP MLD, a first frame for the TID on the first link;
   receive, from the AP MLD, a first trigger frame on a second link to which the TID is not mapped; and
   transmit, to the AP MLD, in response to the first trigger frame, a Quality of Service (QoS) null frame comprising the TID on the second link, wherein the QoS null frame comprises a first buffer status report (BSR) for the TID.

16. The non-transitory computer-readable medium of claim 15, wherein the second link is an enabled link to which at least one TID is mapped according to the TID-to-link mapping.

17. The non-transitory computer-readable medium of claim 15, wherein the first frame for the TID comprises a Medium Access Control (MAC) Service Data Unit (MSDU) or an Aggregated MSDU (A-MSDU) for the TID.

18. The non-transitory computer-readable medium of claim 15, wherein the QoS null frame comprises a second BSR for another TID mapped to the second link.

19. The non-transitory computer-readable medium of claim 15, wherein the QoS null frame comprises a QoS control field or a BSR control subfield that comprises the first BSR for the TID.

20. The non-transitory computer-readable medium of claim 15, wherein the instructions, when executed by the one or more processors, further cause the non-AP MLD to:
   receive, from the AP MLD, in response to the QoS null frame, a second trigger frame on the first link, the second trigger frame allocating uplink resources on the first link to the non-AP MLD for the TID; and
   transmit, to the AP MLD, in response to the second trigger frame, a second frame comprising a QoS data frame for the TID.

* * * * *